United States Patent
Yun et al.

(10) Patent No.: US 7,020,131 B1
(45) Date of Patent: Mar. 28, 2006

(54) SYSTEM AND METHOD FOR HIERARCHICAL SWITCHING

(75) Inventors: Kenneth Yi Yun, San Diego, CA (US); Kevin Warren James, San Diego, CA (US)

(73) Assignee: Applied Micro Circuits Corp., San Diego, CA (US)

( * ) Notice: Subject to any disclaimer, the term of this patent is extended or adjusted under 35 U.S.C. 154(b) by 952 days.

(21) Appl. No.: 10/035,835

(22) Filed: Dec. 24, 2001

(51) Int. Cl.
*H04L 12/66* (2006.01)
*H04L 12/50* (2006.01)
*H04L 12/28* (2006.01)
*H04Q 11/00* (2006.01)
*H04J 3/02* (2006.01)
*G06F 13/00* (2006.01)

(52) U.S. Cl. .................. 370/355; 370/360; 370/386; 370/412; 370/389; 370/462; 710/317

(58) Field of Classification Search .............. None
See application file for complete search history.

(56) References Cited

U.S. PATENT DOCUMENTS

| | | | | |
|---|---|---|---|---|
| 6,073,199 A | 6/2000 | Cohen et al. | ............... | 710/113 |
| 6,275,491 B1 | 8/2001 | Prasad et al. | ............... | 370/389 |
| 6,285,679 B1 | 9/2001 | Dally et al. | .................. | 370/413 |
| 6,487,213 B1 * | 11/2002 | Chao | .......................... | 370/418 |
| 6,519,540 B1 * | 2/2003 | Salandro | ....................... | 702/68 |
| 2001/0050916 A1 * | 12/2001 | Krishna et al. | ............. | 370/419 |
| 2002/0122428 A1 * | 9/2002 | Fan et al. | ................ | 370/395.4 |
| 2003/0072326 A1 * | 4/2003 | Alasti et al. | ................ | 370/462 |
| 2003/0174701 A1 * | 9/2003 | Angle et al. | ................ | 370/390 |

* cited by examiner

*Primary Examiner*—Alpus Hsu
*Assistant Examiner*—Lina Yang
(74) *Attorney, Agent, or Firm*—Law Office of Gerald Maliszewski; Gerald Maliszewski

(57) ABSTRACT

A system and method have been provided for hierarchically arbitrating in a broadband information switching network. The method promotes the fair and efficient distribution of information packets across the switch fabric that ultimately permits the switch to maximally match information packets to switch output addresses, at faster rates and higher throughput. The method comprises: accepting variably sized information packets at a plurality of switch inputs, that address a plurality of switch outputs; at each switch input, queuing the information packets into a plurality of queues; parsing the information packets into units of one cell; simultaneously arbitrating between each switch output and a plurality of available switch inputs, where an available input is defined to have at least one queue with an information packet addressing that particular switch output; selecting a queue; locking the link between switch inputs and switch outputs; and, transferring information packets across the links in units of one cell per master decision cycle.

30 Claims, 14 Drawing Sheets

SYSTEM AND METHOD FOR HIERARCHICAL SWITCHING

BACKGROUND OF THE INVENTION

1. Field of the Invention

This invention relates generally to information packet switch arbitration and, more particularly, to a system and method for fairly and efficiently directing the flow of variably sized information packets across a switch with a plurality of crossbars.

2. Description of the Related Art

As noted in U.S. Pat. No. 6,285,679 (Dally et al.), data communication between computer systems for applications such as web browsing, electronic mail, file transfer, and electronic commerce is often performed using a family of protocols known as IP (internet protocol) or sometimes TCP/IP. As applications that use extensive data communication become more popular, the traffic demands on the backbone IP network are increasing exponentially. It is expected that IP routers with several hundred ports operating with aggregate bandwidth of Terabits per second will be needed over the next few years to sustain growth in backbone demand.

The network is made up of links and routers. In the network backbone, the links are usually fiber optic communication channels operating using the SONET (synchronous optical network) protocol. SONET links operate at a variety of data rates ranging from OC-3 (155 Mb/s) to OC-192 (9.9 Gb/s). These links, sometimes called trunks, move data from one point to another, often over considerable distances.

Routers connect a group of links together and perform two functions: forwarding and routing. A data packet arriving on one link of a router is forwarded by sending it out on a different link depending on its eventual destination and the state of the output links. To compute the output link for a given packet, the router participates in a routing protocol where all of the routers on the Internet exchange information about the connectivity of the network and compute routing tables based on this information.

Most prior art Internet routers are based on a common bus or a crossbar switch. In the bus-based switch of a SONET link, a line-interface module extracts the packets from the incoming SONET stream. For each incoming packet, the line interface reads the packet header, and using this information, determines the output port (or ports) to which the packet is to be forwarded. To forward the packet, the line interface module arbitrates for the common bus. When the bus is granted, the packet is transmitted over the bus to the output line interface module. The module subsequently transmits the packet on an outgoing SONET link to the next hop on the route to its destination.

Bus-based routers have limited bandwidth and scalability. The central bus becomes a bottleneck through which all traffic must flow. A very fast bus, for example, operates a 128-bit wide datapath at 50 MHz giving an aggregate bandwidth of 6.4 Gb/s, far short of the Terabits per second needed by a backbone switch. Also, the fan-out limitations of the bus interfaces limit the number of ports on a bus-based switch to typically no more than 32.

The bandwidth limitation of a bus may be overcome by using a crossbar switch. For N line interfaces, the switch contains N(N-1) crosspoints. Each line interface can select any of the other line interfaces as its input by connecting the two lines that meet at the appropriate crosspoint. To forward a packet with this organization, a line interface arbitrates for the required output line interface. When the request is granted, the appropriate crosspoint is closed and data is transmitted from the input module to the output module. Because the crossbar can simultaneously connect many inputs to many outputs, this organization provides many times the bandwidth of a bus-based switch.

Despite their increased bandwidth, crossbar-based routers still lack the scalability and bandwidth needed for an IP backbone router. The fan-out and fan-in required by the crossbar connection, where every input is connected to every output, limits the number of ports to typically no more than 32. This limited scalability also results in limited bandwidth. For example, a state-of-the-art crossbar might operate 32 different 32-bit channels simultaneously at 200 MHz giving a peak bandwidth of 200 Gb/s. This is still short of the bandwidth demanded by a backbone IP router.

FIG. 1 is a schematic block diagram illustrating a conventional packet switch (prior art). As noted in U.S. Pat. No. 6,275,491 (Prasad et al.), the architecture of conventional fast packet switches may be considered, at a high level, as a number of inter-communicating processing blocks. In this switch, ports $P_0$ through $P_n$ are in communication with various nodes, which may be computers or other switches (not shown). Each of the ports receive data over an incoming link, and transmits data over an outgoing link. Each of the ports are coupled to switch fabric F, which effects the routing of a message from the one of input ports, to the one of n output ports associated with the downstream node on the path to the destination of the packet. The switch has sufficient capability to divide the packet into slices (when on the input end) and to reconstruct slices into a packet (when on the output end). Arbitor A is provided to control the queuing of packets into and out of switch fabric F, and to control the routing operation of switch fabric F accordingly.

While the high-level architecture of fast packet switches may be substantially common, different architectural approaches are used in the implementation of the fast packet switch. These approaches determine the location (input, output, or both) and depth of cell queues or buffers, and also the type of routing used within switch fabric. For example, one architecture may operate by the input ports forwarding each received cell immediately to switch fabric F, which transfers cells at its input interfaces to its output interfaces in a time-division multiplexed fashion; on the output side, each cell that is output from switch fabric F is appended to a FIFO queue at its addressed output port. Another architecture may utilize input queues at the input ports, with arbitor A controlling the order in which cells are applied from the input queues to switch fabric F, which operates in a crossbar mode. Another architecture may utilize both input and output queues at the input ports, with switch fabric F and arbitor A operating as a multistage interconnection network. These and other various architectures are known in the field of fast packet switching.

Also as is well known in the art, actual communication traffic is neither uniform nor independent; instead, real traffic is relatively bursty, particularly in the communication of data and compressed video. As such, traffic management algorithms are often utilized in fast packet switching to manage the operation of the switch and to optimize switch performance. Examples of well-known traffic management algorithms include traffic shaping, flow control, and scheduling.

As noted in U.S. Pat. No. 6,073,199 (Cohen et al.), arbitors are used in computer systems to control access to a common bus used by multiple devices. Arbitors typically use arbitration schemes such as fixed priority, round robin, or rotating priority. A fixed priority algorithm assigns a priority to each device on the bus and grants usage based upon the relative priority of the devices making the requests. The round robin scheme has a fixed order and grants bus usage based upon the requestor order and the current user of the bus. The rotating priority scheme changes the priority of requestors based on a fixed algorithm. A deficit round robin algorithm is essentially the combination of the round robin algorithm with a system that gives an advantage or "credit" to an entity denied a grant. Conventionally, the fairness inherent in the DRR process is offset by the sequential steps required for implementation.

The goal of all arbitration schemes is to insure fair access to the shared resource, and to efficiently grant the resource to the correct requester. The fixed priority scheme is unfair because a high priority requester can consume all the shared resource, starving the lower priority requesters. The round robin scheme is inefficient because multiple clocks may be required to determine which requestor should be granted the resource. Also round robin schemes have a fixed grant pattern that can result in starvation of particular requesters if request patterns match the round robin grant pattern. Rotating priority schemes are random in their efficiency and fairness based on the algorithm chosen to update device priority.

It would be advantageous if a switch were able to reduce processing overhead by locking a switch input to an output to transfer a variably sized information packet.

It would be advantageous if arbitration for the switch links could be conducted simultaneously to minimize processing overhead. Likewise, it would be advantageous if arbitration between a plurality of crossbars could also be conducted simultaneously.

SUMMARY OF THE INVENTION

Conventional switches are often inefficient in that the arbitration process conducted to link switch inputs to switch outputs must be conducted sequentially. As a result, the link decisions occur over the course of a number of clock cycles. The arbitration process can be slowed even further if the switch is composed of a number of crossbars. The decision process for each crossbar is often conducted sequentially. The present invention switch minimizes the overhead associated with linking decisions by conducting a simultaneous arbitration process.

Accordingly, a hierarchical arbitration method is provided for use in the switching of information packets having a variable number of cells. The method promotes the fair and efficient distribution of information packets across the switch fabric that ultimately permits the switch to maximally match information packets to switch output addresses, at faster rates and higher throughput. The method comprises: accepting information packets at a plurality of switch inputs, that address a plurality of switch outputs; at each switch input, queuing the information packets into a plurality of queues; parsing the information packets into units of one cell; simultaneously arbitrating between each switch output and a plurality of available switch inputs, where an available input is defined to have at least one queue with an information packet addressing that particular switch output; selecting a queue; locking the links between switch inputs and switch outputs; and, transferring information packets across the links in units of one cell per master decision cycle.

Simultaneously arbitrating for a plurality of links includes: establishing an available switch input priority list for each output; and, nominating the least recently used switch inputs in response to the available switch input priority list. The simultaneous arbitration process includes a plurality of arbitration cycles for each crossbar. For each switch output, the highest priority available switch input is nominated in a first arbitration cycle; and, if the nominating switch output is not accepted, successively lower priority available switch inputs are nominated in subsequent arbitration cycles.

Nominating switch outputs are not automatically accepted, because the simultaneous nomination process allows for the possibility of multiple outputs nominating the same input. For each switch input receiving multiple nominations, another arbitration process occurs between the nominating switch outputs. The nominating switch output is selected as follows: for each available switch input, establishing a nominating switch output priority list; and, accepting the least recent used nominating switch outputs in response to the nominating switch output priority list.

The arbitration process is considered simultaneous because the available inputs for each output address are all nominated simultaneously, in each arbitration cycle. Likewise, the nominated outputs are all accepted simultaneously, in each arbitration cycle.

Once arbitration for a link is completed, each nominated switch input selects a queue. In some aspects of the invention, the least recently used queue is selected. Alternately, the queue is selected based upon the class of service (COS) of the information packets.

Additional details of the above-mentioned arbitration method, and a system of arbitrating the transfer of information packets across a switch, are provided below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a device. These descriptions and representations are the means used by those skilled in the data processing arts to most effectively convey the substance of their work to others skilled in the art. A procedure, microprocessor executed step, data item, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a switch. It has proven convenient at times, principally for reasons of common usage, to refer to these signals as bits, values, elements, symbols, characters, terms, data items, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution. Further, a software application can switch, link, parse, select, or arbitrate.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "determining" "recognizing" or "comparing" or "replacing" or "addressing" or "retrieving" or "parsing" or "switching" or the like, refer to the action and operations of in a system that manipulates and transforms data represented as physical (electronic) quantities within the computer system's registers and memories into other data similarly represented as physical quantities within the switch, or switch peripherals.

Figure 1:
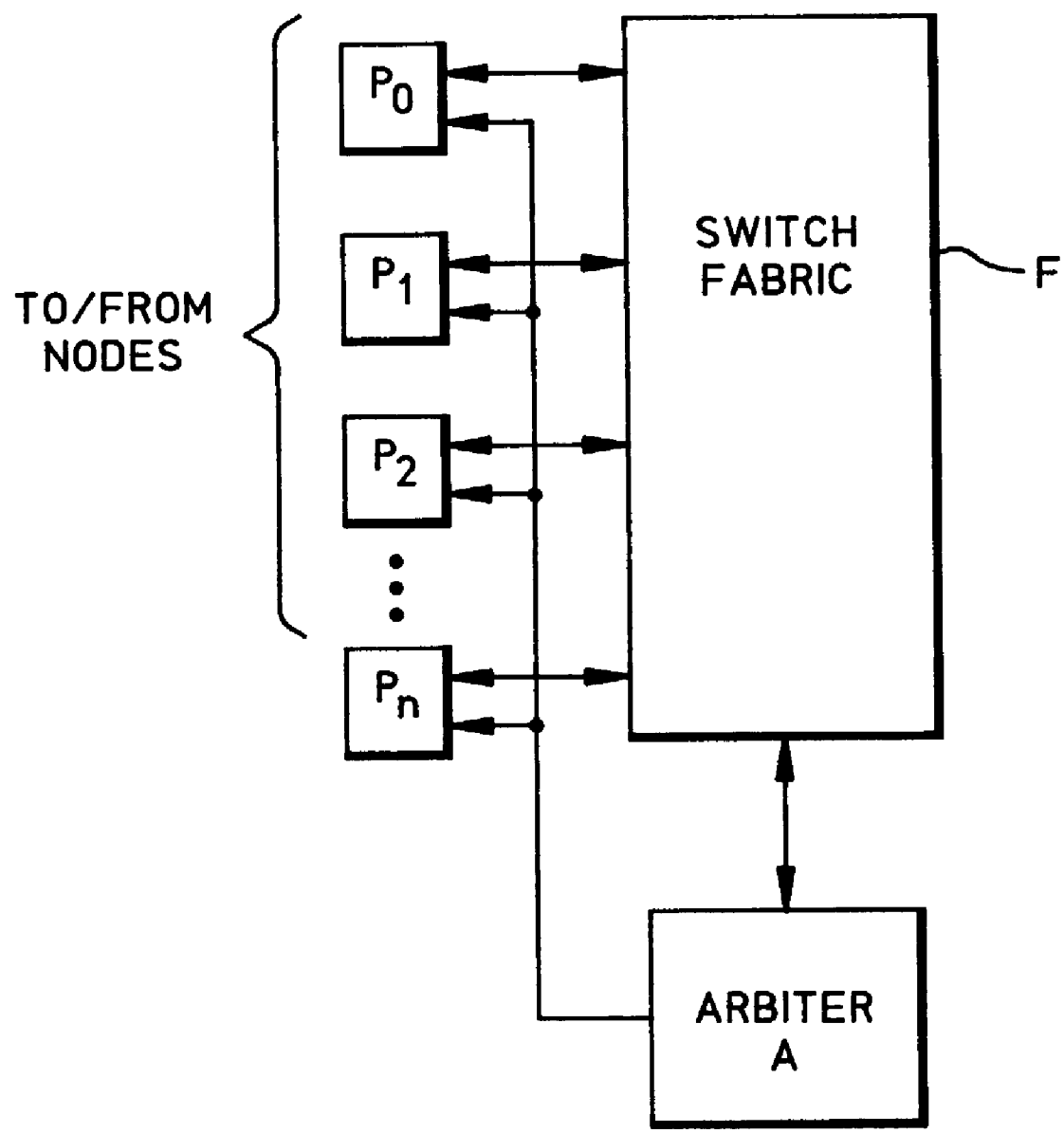
FIG. 1 is a schematic block diagram illustrating a conventional packet switch prior art).
Figure 2A:
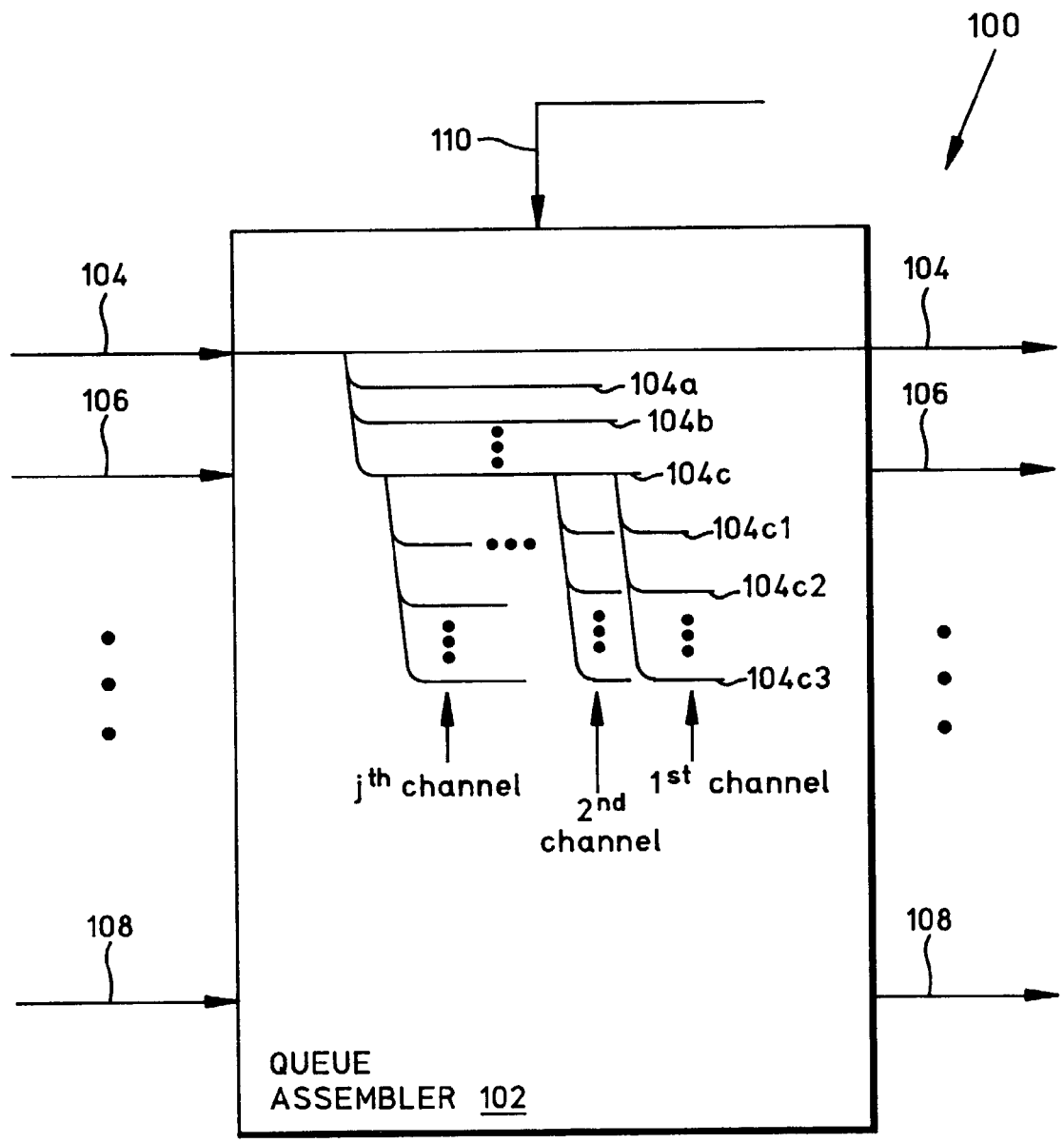
FIGS. 2a and 2b are schematic block diagrams illustrating aspects of the present invention hierarchical arbitration system for transferring information across a switch.
Figure 2B:
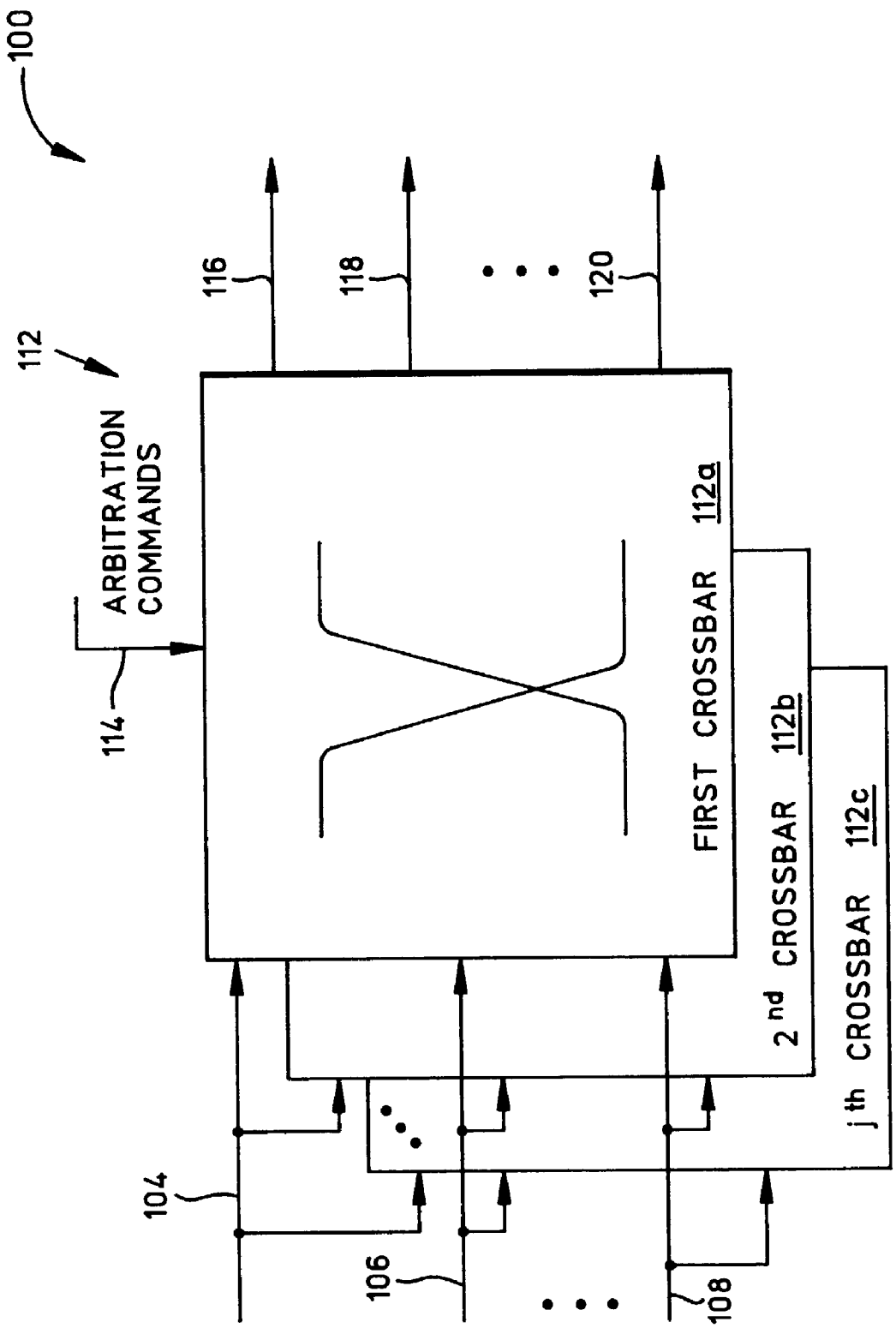

FIGS. 2a and 2b are schematic block diagrams illustrating the present invention hierarchical arbitration system for transferring information across a switch. In FIG. 2a, the system 100 comprises a queue assembler 102 with a plurality of inputs to accept variably sized information packets having a plurality of cells and addressing a plurality of outputs. A first input on line 104, a second input on line 106, and an nth input on line 108 are shown. The present invention is not limited to any particular number of inputs, and the dotted line between the second and nth inputs is intended to represent the potential for additional inputs. The queue assembler 102 has a control input on line 110 to accept queue selection commands. The queue assembler 102 queues the information packets into a plurality of queues. The queue assembler has a plurality of outputs. A first output on line 104, a second output on line 106, and an nth output is shown on line 108. Again, the invention is not limited to any particular number of queue assembler outputs.

It should also be understood that the queue assembler groups the information packets received at each queue assembler input by switch output address. Thus, if a switch has n outputs, the queue assembler 102 will generate n groups of information packets differentiated by address. As shown, information packets addressing the first switch output are grouped on line 104a, the second switch output on line 104b, and the nth switch output on line 104c. The information packets received on line 104 in each address group are also queued. As shown, the information packets addressing switch output n are queued into a first queue on line 104c1, a second queue on line 104c2, and a pth queue on line 104c3. Again the invention is not limited to any particular number of queues, and the dotted lines between lines 104c2 and 104c3 are intended to represent the potential of additional queues. Each of the other queue assembler inputs also groups information packets by switch output address, and queues the information packets. However, for simplicity the queuing is only displayed with the first input. In some aspects of the invention, the queue assembler additionally channels information packets into channels at each queue assembler output, and the information packets are queued in the channels. As shown, the queues on lines 104c1, 104c2, and 104c3 are associated with a first channel, while parallel queues are shown associated with a second channel and a jth channel. Again, the invention is not limited to any particular number of channels. For simplicity, the present invention will be explained assuming that the information packets are not channelized (there is only one channel).

The queues are supplied in the queue assembler outputs, selected in response to queue selection commands on line 110. As explained in more detail below, each queue assembler output may supply information packets to a plurality of switch addresses. However, for the sake of simplicity, the queue assembler outputs are depicted as a single line.

FIG. 2b is a schematic block diagram of the hierarchical arbitration system switch 112. The switch 112 has a plurality of inputs connected to the queue assembler outputs. As shown, a first switch input is connected to the first queue assembler output on line 104, a second switch input is connected to the second queue assembler output on line 106, and an nth switch input is connected to the nth queue assembler output on line 108. A control input on line 114 accepts arbitration commands. The switch 112 has a plurality of outputs selectively connected to the switch inputs in response to the arbitration commands on line 114. As shown, the switch 112 has a first output, or output address on line 116, a second output on line 118, and an nth output on line 120. As is explained in greater detail below, each switch output and switch input is a summation of lines connected to the crossbars of the switch 112, where each crossbar can be controlled to connect any switch input to any switch output. The switch 112 locks the links between switch inputs and switch outputs in response to commands from an arbiter, and transfers information packets across the links.

Figure 3A:
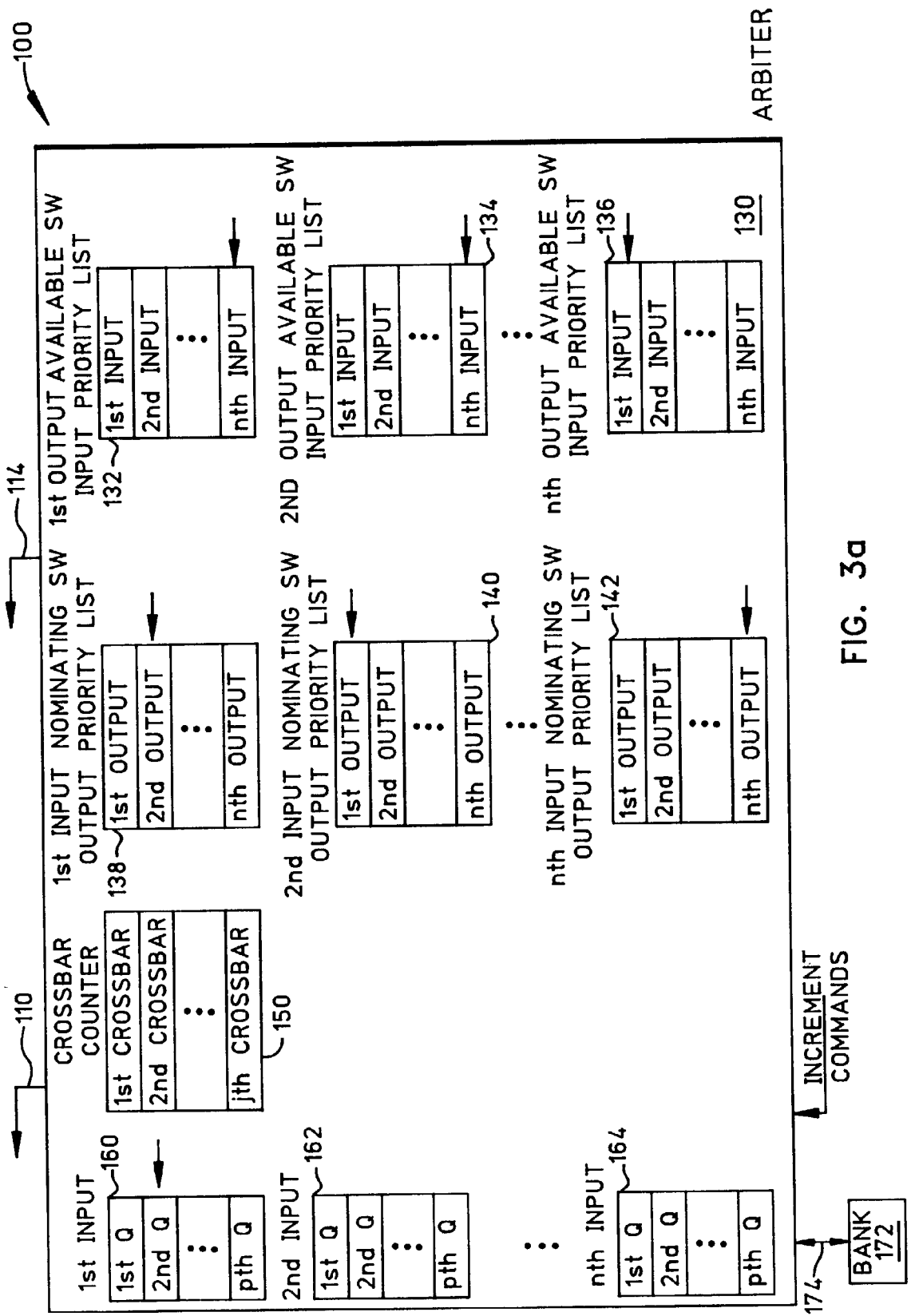
FIGS. 3a–3d are schematic block diagrams of the hierarchical arbitration system arbiter.

FIGS. 3a–3d are schematic block diagrams of the hierarchical arbitration system arbiter 130. In FIG. 3a, the arbiter 130 has an output on line 114 connected to the switch control input to supply simultaneously arbitrated link commands for the plurality of links between the switch inputs and the switch outputs. The arbiter 130 also has an output connected to the queue assembler control input on line 110 to select a queue for each linked switch input. Typically, the queue assembler 102 (FIG. 2a) parses the variably sized information packets into units of one cell, where a cell is defined to be a predetermined number of bytes. The present invention is not limited to any particular number of cells in an information packet or any particular number of bytes in a cell. The switch 112 (FIG. 2b) transfers the information packets in units of one cell per master decision cycle (per link).

Returning to FIG. 2b, the switch 112 includes a first plurality of crossbars. Each crossbar includes a crossbar network of switches that can connect any switch output to any switch input in response to control commands from the arbiter 130. Shown is a first crossbar 112a, a second crossbar 112b, and a jth crossbar 112c. Again, the dots between the second crossbar 112b and the jth crossbar 112c are intended to represent any potential number of crossbars. It is a feature of the system 100 that the arbiter 130 simultaneously arbitrates for a plurality of links each minor decision cycle. One master decision cycle includes a first plurality of minor decision cycles, where a minor decision cycle describes the arbitration process for a single crossbar. A plurality of arbitration cycles can occur in the context of the minor decision cycles. Within a particular arbitration cycle for a particular crossbar, all the links in a crossbar can be arbitrated simultaneously.

More specifically, the arbiter 130 simultaneously arbitrates between each switch output and a plurality of available switch inputs, having information packets addressed to that switch output, for each crossbar. It should be understood that once a link is locked to a switch output, that output refrains from arbitration until the information packet is completely transferred. As defined herein, an arbitrating switch output is a switch output that is not part of a locked link connection, and has an information packet addressed to it from at least one switch input. Likewise, a switch input is not available for arbitration if it already locked to an output, or if the switch input has no information packets addressing a particular switch output. This analysis is carried on for each crossbar.

Generally, the arbiter 130 arbitrates between each arbitrating switch output and a plurality of available switch inputs by selecting the least used available switch input. However, because of the simultaneous arbitrations, it is possible for a plurality of switch outputs to select the same switch input. Alternately stated, switch outputs 116, 118, and 120, for example, may all select the same switch input 104. To alleviate such contention, the arbiter 130 simultaneously arbitrates between each arbitrating switch output and a plurality of available switch inputs, in a plurality of arbitration cycles each decision cycle. That is, the contention is resolved in a series of arbitration cycles.

As shown in FIG. 3a, the arbiter 130 includes an available switch input priority list for each switch output. Shown is an available switch input priority list 132 for a first output, an available switch input priority list 134 for a second output, and an available switch input priority list 136 for nth output. The arbiter 130 nominates switch inputs, for each switch output, in response to the available switch input priority lists 132–136. The available switch inputs are nominated from the lists 132–136 simultaneously.

For example, in a first arbitration cycle the arbiter 130 simultaneously arbitrates for a plurality of links, by nominating the highest priority available switch input, for each switch output. If the nominating switch output is not accepted, successively lower priority available switch inputs are nominated in subsequent arbitration cycles.

Each available switch input priority list 132–136 includes a sequential input pointer that, following the acceptance of a first nominating switch output by a first switch input, is incremented to a second switch input, next in sequence to the first switch input. Then, the arbiter 130 nominates the available switch input closest in succession to the second switch input in subsequent arbitrations.

For example, it is assumed that all three switch inputs are available, and that all the switch outputs are arbitrating. The pointer for the first list 132 is directed at the nth input, as is the pointer for the second list 134. The pointer for the nth list 136 is directed to the first input. Since there is no contention for the first input, the first switch input is linked to the nth switch output, and the nth list pointer 136 is directed to the second input. However, there is contention between the first and second switch outputs for the nth switch input. If the first output is accepted by the nth switch input (details of the acceptance process follow), then the link between the nth switch input and the first switch output is locked, and the first list pointer is directed to the next input on the list, the first input.

Because of contention, the arbitration process also includes a mechanism for available inputs to select between multiple nominating outputs. That is, the arbiter 130 arbitrates between the nominating switch outputs in response to a switch input receiving multiple switch output nominations. Again, the basic principle is for the arbiter 130 to arbitrate between the nominating switch outputs by accepting the least recently used nominating switch output.

As shown in FIG. 3a, the arbiter 130 includes a nominating switch output priority list for each available switch input. A first nominating switch output list 138, a second nominating switch output list 140, and an nth nominating switch output list 142 are shown. The arbiter 130 accepts nominating switch outputs in response to the nominating switch output priority lists 138–142. The arbiter simultaneously accepts nominating switch outputs from the nominating switch output priority lists, for each switch input receiving a plurality of nominating switch outputs.

More specifically, the arbiter 130 accepts the highest priority nominating switch outputs from the nominating switch output priority lists in a plurality of arbitration cycles per crossbar. Each nominating switch output priority list includes a sequential output pointer that, following the acceptance of a nominating switch output, is incremented to a second switch output, next in sequence to the first switch output. The arbiter 130 accepts the nominating switch output closest in succession to second switch output in subsequent arbitrations.

Continuing the example started above, the first and second switch outputs are both nominating outputs with respect to the nth switch input. The pointer of the nth nominating switch output list 142 is directed to the nth output. However, the nth output is not a nominating switch output. Therefore, the pointer goes to the next output in succession, the first output, and the first output is accepted.

It is a design consideration as to the number of arbitration cycles that are included in every master decision cycle. Fewer arbitration cycles result in less processing time, at the possible expense of reduced throughput per master decision cycle. To continue the example still further, the arbiter 130 enters into a second arbitration cycle. At this point, only the second switch output remains unlinked. The pointer for the second list 134 is directed to the nth input, but the nth input is no longer available, as it is locked to the first switch output. The pointer then moves to the next available input in succession, which is the second input. The first input, locked to the nth switch output, is not available. The second switch input accepts the second nominating switch output.

The above-mentioned arbitration example is based upon a single crossbar switch. However, as shown in FIG. 2b, the switch 112 typically includes a plurality of crossbars with parallely connected inputs and outputs that correspond to the plurality of switch inputs on lines 104–108 and switch outputs on lines 116–120. That is, the first switch input on line 104 services as the first input of each of the crossbars 112a, 112b, and 112c. Returning to FIG. 3a, the arbiter 130 includes a crossbar counter 150. The crossbar counter 150 includes the first, second, and jth crossbars 112a–112c. The arbiter 130 arbitrates between each switch output and a plurality of available switch inputs in response to the crossbar selected from the crossbar priority counter 150. Crossbars are visited in a fixed sequence according to the crossbar counter 150.

More specifically, the arbiter 130 arbitrates between each switch output and a plurality of available switch inputs by arbitrating in a plurality of arbitration cycles, for each selected crossbar. The arbiter 130 nominates first available switch inputs, for each switch output, in a first crossbar. The available switch input priority list pointers are incremented to a second switch input, next in succession to the first switch input, following the acceptance of first available switch inputs. Then, the crossbar counter is incremented to a second crossbar, next in succession to the first crossbar. The arbiter 130 nominates switch inputs closest in succession to the second switch input for each switch output in the second crossbar. Thus, the arbiter 130 arbitrates for a plurality of nominating switch outputs, for each crossbar.

Figure 3B:
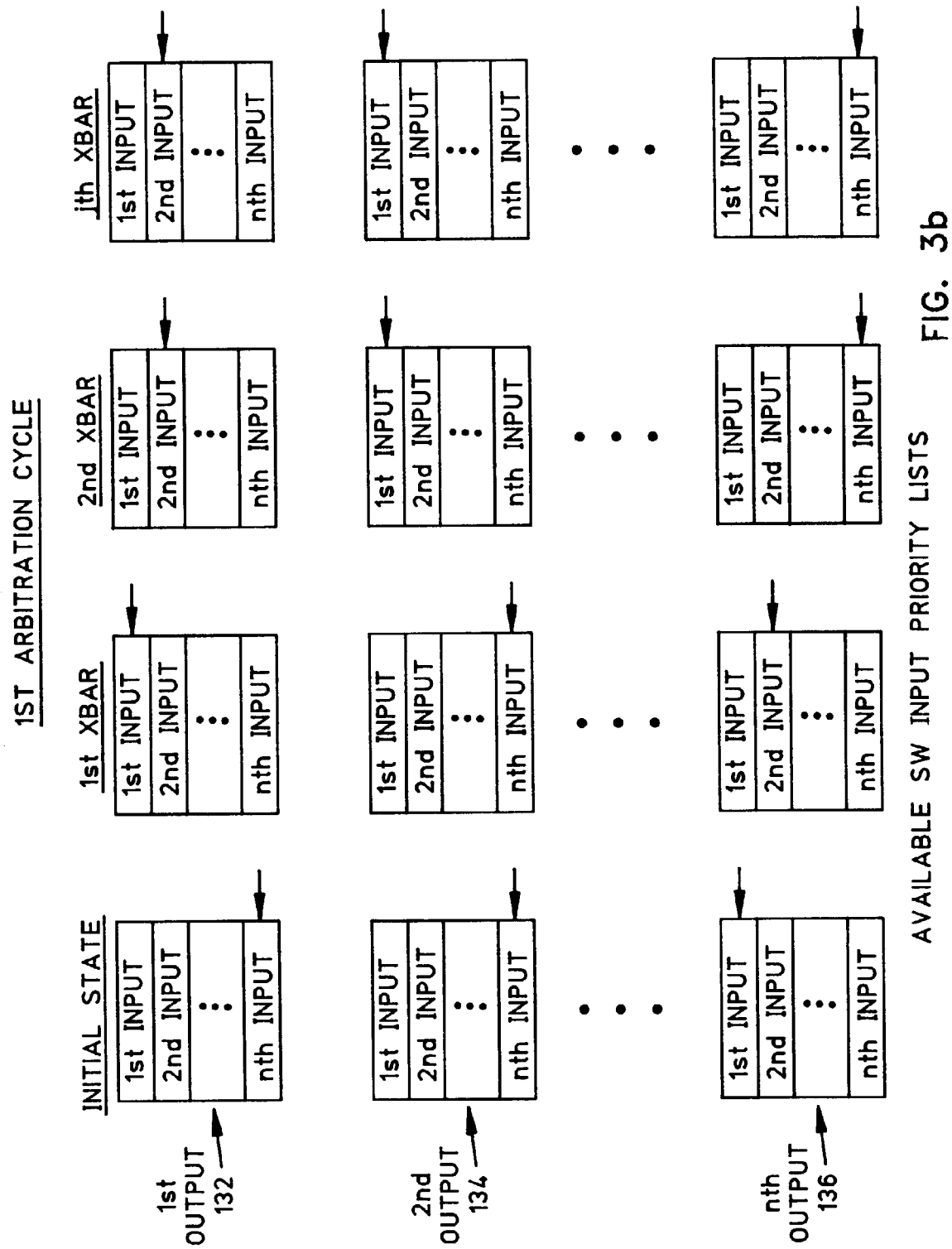

Using the example started above and viewing FIG. 3*b*, an assumption is made that the crossbar counter is directed at the first crossbar. At the end of the first arbitration cycle (described above) for the first crossbar, the nth switch output has been linked to the first switch input, and the pointer incremented to the second input. The first switch output has been linked to the nth input, and the pointer incremented to the first input. The second switch output remains unlinked with the pointer directed at the nth input.

Then, the crossbar counter increments to the second crossbar and the first arbitration cycle continues. For the second crossbar it is assumed that all the switch inputs are available and all the switch outputs are arbitrating. Since the first list 132 pointer is directed to the first input, the second list 134 pointer directed to the nth input, and the nth list 136 pointer directed to the second input, there is no contention. All the nominating outputs in the second crossbar are accepted, and each of the list pointers is incremented. That is, the first list 132 pointer is directed to the second input, the second list 134 pointer is directed to the first input, and the nth list 136 pointer is directed to the nth input.

The crossbar counter increments to the jth crossbar (j=3), and it is assumed that none of the switch outputs is arbitrating. That is, the switch outputs for the jth crossbar are all in a locked linked. The first arbitration cycle ends.

Figure 3C:
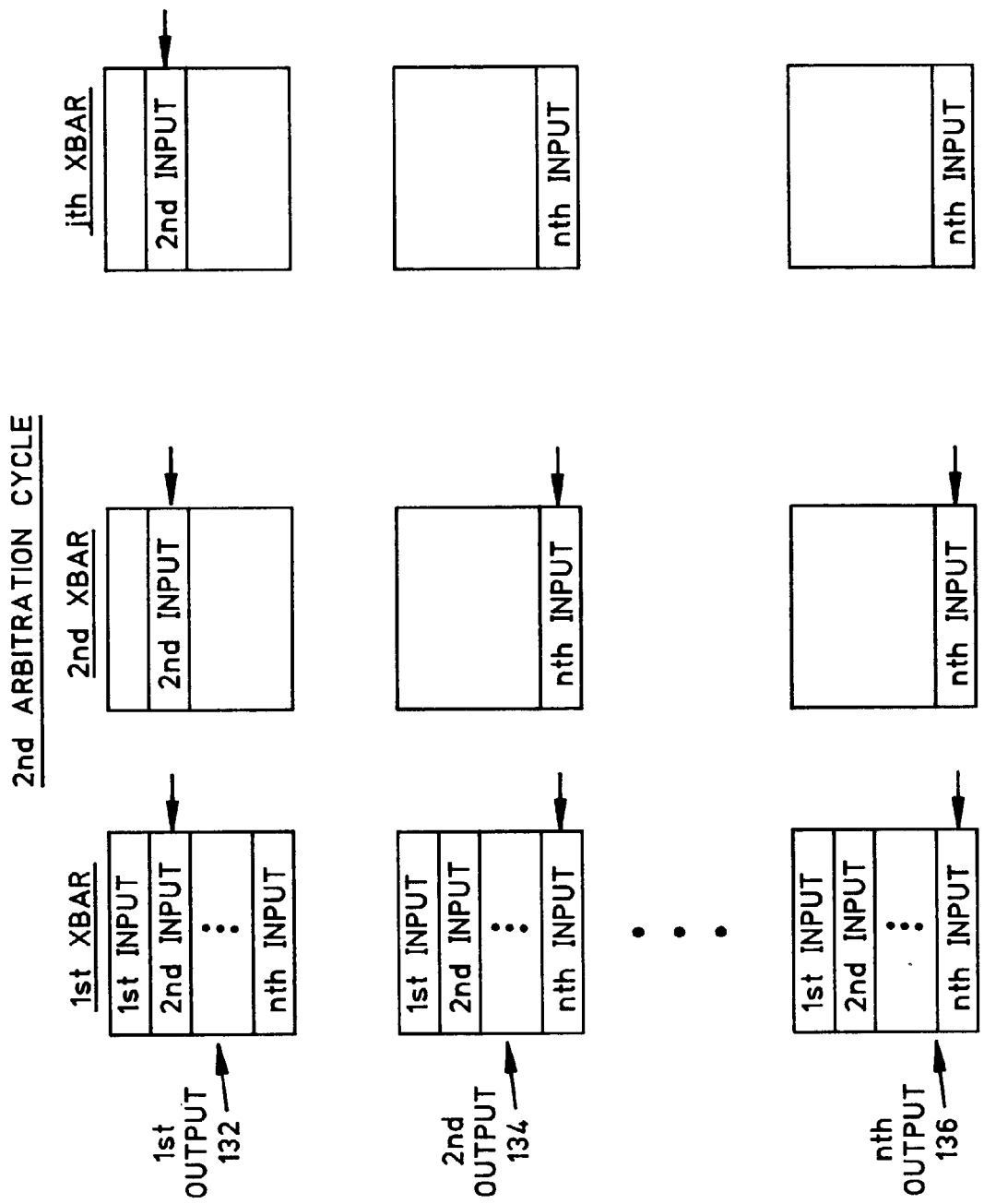

The crossbar pointer increments to the first crossbar, and the second arbitration cycle begins as shown in FIG. 3*c*. For the first crossbar, the second switch output remains unlinked. The second list 134 is directed at the first input, which is unavailable. The next input in succession, the second input is available. The second switch output and second switch input are linked, and the second list 134 pointer is directed to the nth input. Since all the links are locked in the second and jth crossbars, no further arbitration is required.

The nominating switch output priority lists 138–142 are also incremented in response to cycling through the crossbars every major decision cycle. The crossbar counter initially selects a first crossbar. The nominating switch output priority list pointers are directed to first switch outputs. The arbiter 130 selects the first nominating switch outputs in the first crossbar and accepts the first nominating switch outputs. The nominating switch output priority list pointers are incremented to a second switch output, next in sequence to the first switch output, following the acceptance of the first nominating switch outputs. The crossbar pointer selects a second crossbar, next in succession to the first crossbar, and the arbiter 130 accepts nominating switch outputs in a second crossbar closest in succession to the second switch output for each switch input.

Figure 3D:
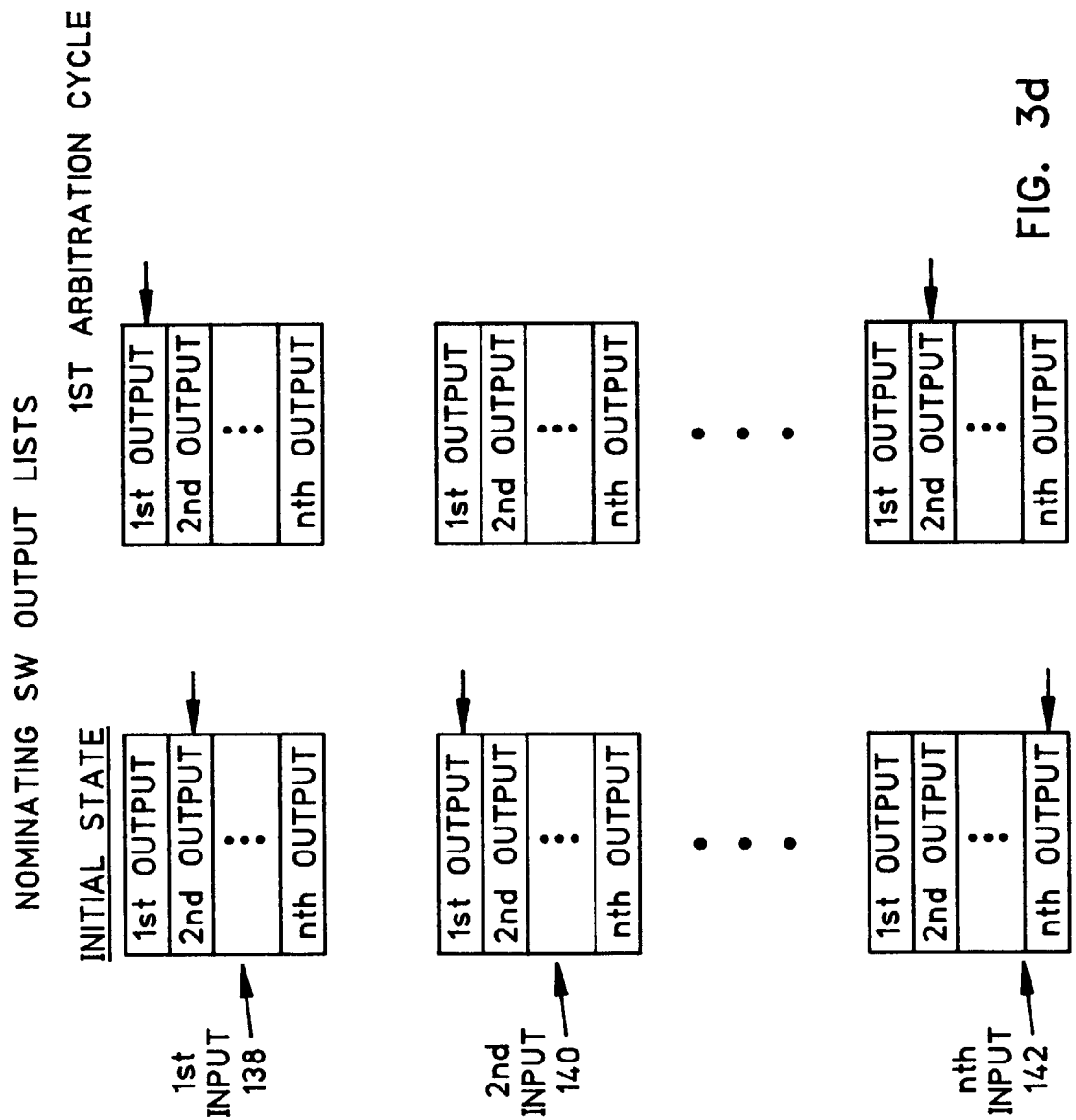

Using the above example and viewing FIG. 3*d*, at the end of the first crossbar, first arbitration cycle, the nth input nominating switch output priority list 142 has selected the first output. The nth list 142 pointer was incremented to the second output. If multiple switch outputs had nominated the nth input in the second crossbar phase of the first arbitration cycle, then that contention would have been resolved in response to the nth list 142 pointer being directed to the second output. Thus, the nominating switch output list pointers can potentially increment for every crossbar in the arbitration cycles. The above discussion applies as well to the input priority lists.

The arbiter 130 performs an additional function, that of selecting a queue in each nominated switch input. Again this queue selection process must be considered in the context of each crossbar. The queue can be selected on the principle of the least recently used queue, or upon the class of service (COS) of the information packets. The least recently used principle is explained first.

The arbiter 130 includes a queue list for each switch input. A first input queue list 160, a second input queue list 162, and an nth input queue list 164 are shown. Generally, each input queue list 160–164 can be said to have a queue pointer directed to a first queue. In response to the queue pointer, the arbiter 130 selects the first queue for each switch input accepting a nominating switch output in a first crossbar. The queue pointers, following the selection of each first queue, are incremented to a second queue, next in sequence to the first queue. Then, the arbiter 130 selects queues closest in succession to the second queue for each switch input accepting a nominating switch output in the second crossbar.

For example, a first switch input is nominated for a first switch, in the first arbitration cycle. As shown, the first input list 160 pointer is directed at the second queue. The second queue is selected for the first crossbar, and the pointer is directed to the pth queue. If the first switch input is nominated in the first arbitration cycle, for the second crossbar, then the pth queue is selected in response to the first list 160 pointer, and incremented to the first queue. The queue selection lists function in a manner equivalent to the input and output lists described above, and a detailed example of their application is not presented in the interest of brevity.

Returning to FIG. 2*a*, in some aspects of the invention, the queue assembler 102 accepts information packets having a ranked COS, and queues the information packets by COS. Thus, the queues on lines 104*c*1, 104*c*2, and 104*c*3 would be differentiated by the COS of the received information packets. Returning to FIG. 3*a*, the arbiter 130 selects a queue in response to COS of the available information packets of each queue, for each crossbar.

Generally, the arbiter 130 establishes a plurality of selection cycles per decision cycle, and simultaneously analyzes information packets at the head of each COS queue in each selection cycle, in response to the number of cells in each information packet.

The arbiter 130 has an input on line 170 to accept commands selecting an accumulation increment for each of the plurality of COS queues, where each accumulation increment defines a selected number of cells. The arbiter 130 selects an information packet for transfer in response to the simultaneous analysis by comparing the number of cells in the information packet at the head of the queue to its corresponding accumulation increment. Typically, the arbiter 130 accepts commands selecting accumulation increments with larger numbers of cells for higher ranking COS queues.

The arbiter 130 selects an information packet by comparing the number of cells in the information packet at the head of the queue to a corresponding total accumulation in a plurality of selection cycles. For each COS queue, a bank 172 has a port connected to the arbiter on line 174 for banking accumulation increments and supplying a banked accumulation. In each selection cycle, the arbiter 130 compares the number of cells in the information packets at the head of each COS queue to a total accumulation that includes the accumulation increment, plus the banked accumulation, as follows:

if an information packet has a number of cells less than, or equal to, the total accumulation, the information packet is made eligible for selection;

if information packets are eligible from a plurality of queues, the information packet in the queue having the highest COS, or next in an ordered service list, is picked;

if an information packet is picked, the total accumulation minus the number of cells in the selected packet is booked in the bank 172 corresponding to the selected packet; and, if no information packets are picked, the total accumulation of each COS queue is banked in its corresponding bank 172.

Another selection cycle is conducted, up to a maximum number of selection cycles. The invention is not limited to any particular number of selection cycles.

Figure 4:
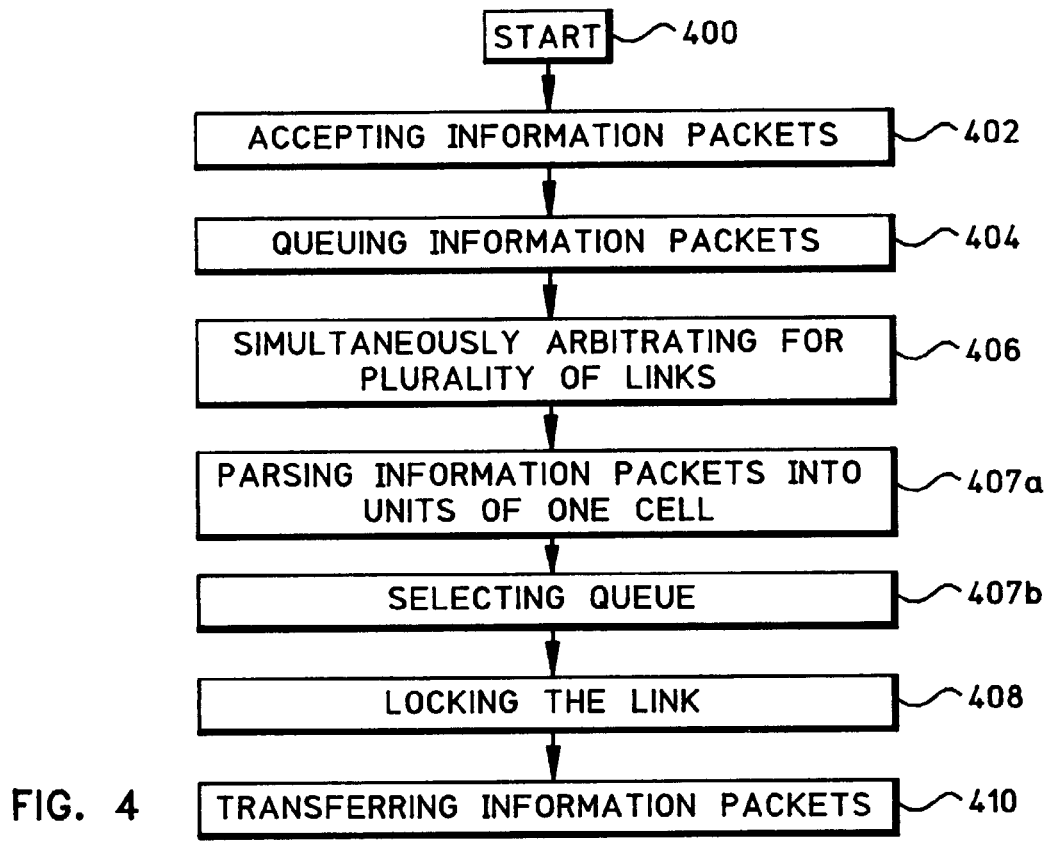
FIG. 4 is a flowchart depicting a hierarchical arbitration method for a switch system.

FIG. 4 is a flowchart depicting a hierarchical arbitration method for a switch system. Although the method (and the methods described below) is depicted as a sequence of numbered steps for clarity, no order should be inferred from the numbering unless explicitly stated. The method begins with Step 400. Step 402 accepts variably sized information packets including a plurality of cells, at a plurality of switch inputs. The plurality of information packets address a plurality of switch outputs. Step 404, at each switch input, queues the information packets into a plurality of queues. Step 406 simultaneously arbitrates for a plurality of links between switch inputs and switch outputs. Step 408 locks the link. Step 410 transfers information packets across the links.

Step 407a parses the information packets into units of one cell. In some aspects of the invention, transferring the information packets in Step 410 includes transferring the information packets in units of one cell per master decision cycle. Step 407b selects a queue for each linked switch input.

Figure 5:
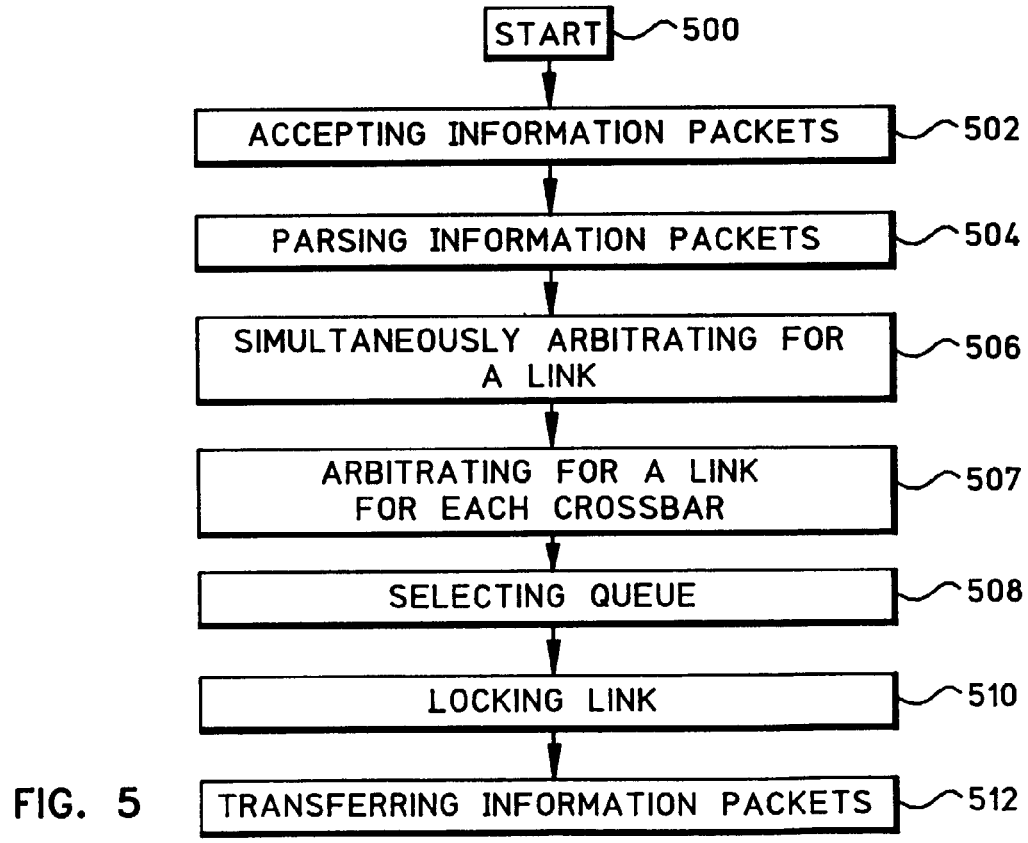
FIG. 5 is a flowchart depicting other aspects of the hierarchical arbitration method for a switch system.

FIG. 5 is a flowchart depicting other aspects of the hierarchical arbitration method for a switch system. The method begins with Step 500. Step 502 accepts variably sized information packets including a plurality of cells, at a plurality of switch inputs. The plurality of information packets address a plurality of switch outputs. Step 504 parses the information packets into units of one cell. Step 506 simultaneously arbitrates for a link to each switch output, from each switch input. Step 508 for each linked switch input, selects a queue. Step 510 locks the links. Step 512 transfers information packets across the links in units of one cell per master decision cycle.

In some aspects of the invention, a first plurality of crossbars are included with a plurality of parallel routed switch inputs and a plurality of parallel routed switch outputs. Step 507 arbitrates for a link to each switch output, for each of the first plurality of crossbars. The arbitration process for each crossbar can be considered a minor decision cycle. In some aspects of the method, a plurality of arbitration cycles can occur across the minor decision cycles.

In some aspects of the invention, simultaneously arbitrating for a plurality of links in Step 506 includes arbitrating for up to a first plurality of links to each switch output, for each crossbar. In other aspects, simultaneously arbitrating for a plurality of links in Step 506 includes, for each switch output in a crossbar, arbitrating between a plurality of available switch inputs having information packets addressed to that switch output.

Simultaneously arbitrating between a plurality of available switch inputs in Step 506 includes selecting the least recently available switch input. In some aspects, simultaneously arbitrating between a plurality of available switch inputs in Step 506 includes arbitrating in a plurality of arbitration cycles each decision cycle.

Figure 6:
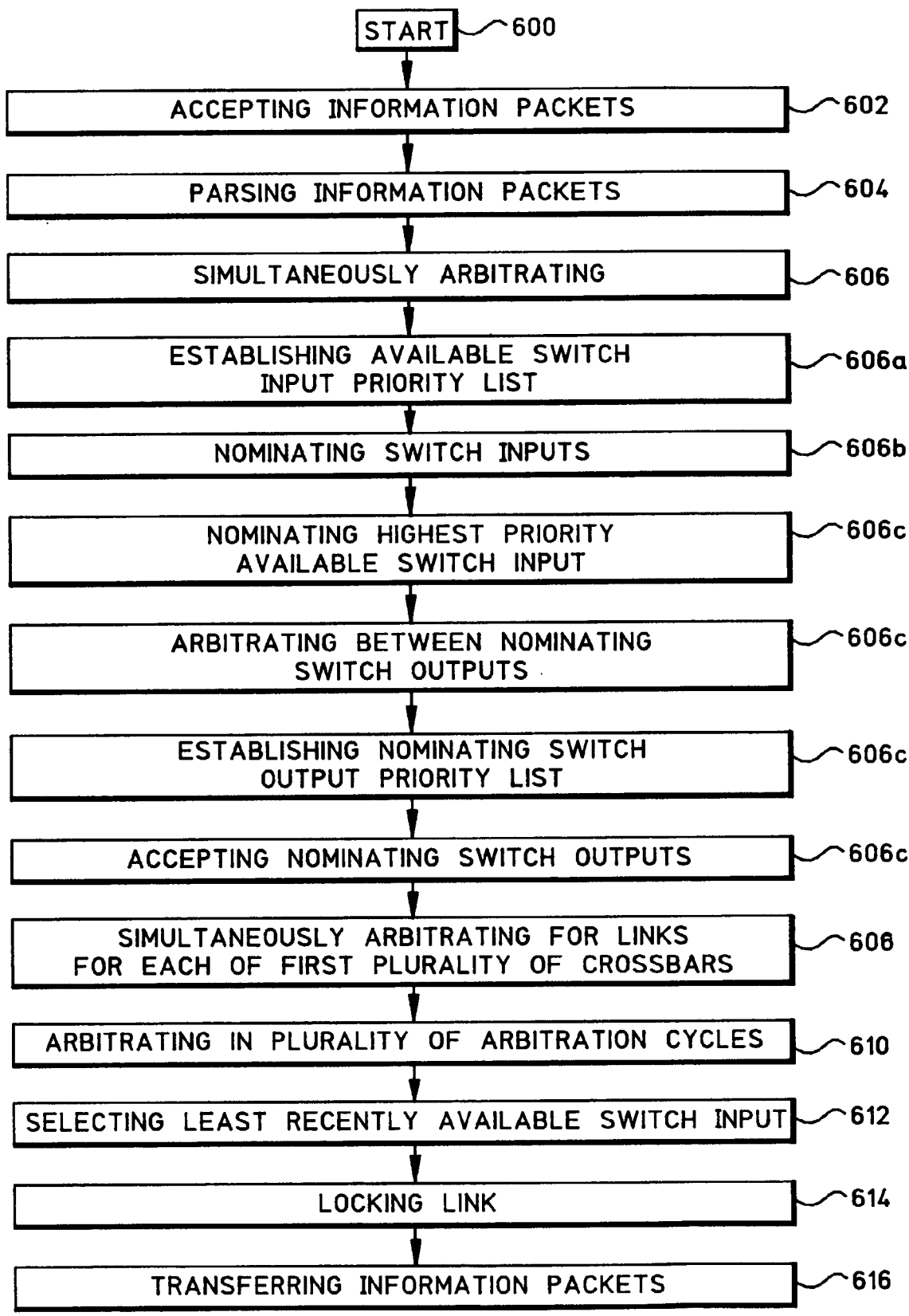
FIG. 6 is a flowchart illustrating a hierarchical arbitration method in a switch system including a first plurality of crossbars with a plurality of parallel routed switch inputs and a plurality of parallel routed switch outputs.

FIG. 6 is a flowchart illustrating a hierarchical arbitration method in a switch system including a first plurality of crossbars with a plurality of parallel routed switch inputs and a plurality of parallel routed switch outputs. The method begins with Step 600. Step 602 accepts variably sized information packets including a plurality of cells, at a plurality of switch inputs. The plurality of information packets address a plurality of switch outputs. Step 604 parses the information packets into units of one cell. Step 606 arbitrates for up to a first plurality of links to each switch output from a plurality of available switch inputs having information packets addressed to that switch output, per master decision cycle. Some aspects of the invention include sub-steps. Step 606a establishes an available switch input priority list for each switch output. Step 606b nominates switch inputs in response to the available switch input priority list. Step 608 arbitrates for links to each switch output, for each of the first plurality of crossbars. Step 610 arbitrates in a plurality of arbitration cycles each decision cycle. Step 612 selects the least recently available switch input. Step 614 locks the links. Step 616 transfers information packets across the links in units of one cell per master decision cycle.

In some aspects of the invention, arbitrating in a plurality of arbitration cycles each decision cycle in Step 606 includes sub-steps. Step 606c nominates the highest priority available switch input in a first arbitration cycle for each switch output. Step 606d nominates successively lower priority available switch inputs in subsequent arbitration cycles if the nominating switch output is not accepted.

A further sub-step, Step 606c1 arbitrates between the nominating switch outputs for each switch input receiving multiple nominations. In some aspects of the invention, arbitrating between the nominating switch outputs in Step 606c1 includes accepting the least recently available nominating switch output. Accepting the least recently available nominating switch output in Step 606c1 includes sub-steps. Step 606c2 establishes a nominating switch output priority list for each available switch input. Step 606c3 accepts nominating switch outputs in response to the nominating switch output priority list.

In some aspects of the invention, arbitrating between nominating switch outputs in Step 606c1 includes the arbitrating switch inputs simultaneously accepting nominating switch outputs. Arbitrating between nominating switch outputs in Step 606c1 also includes each nominated switch input accepting the highest priority nominating switch output.

Figure 7:
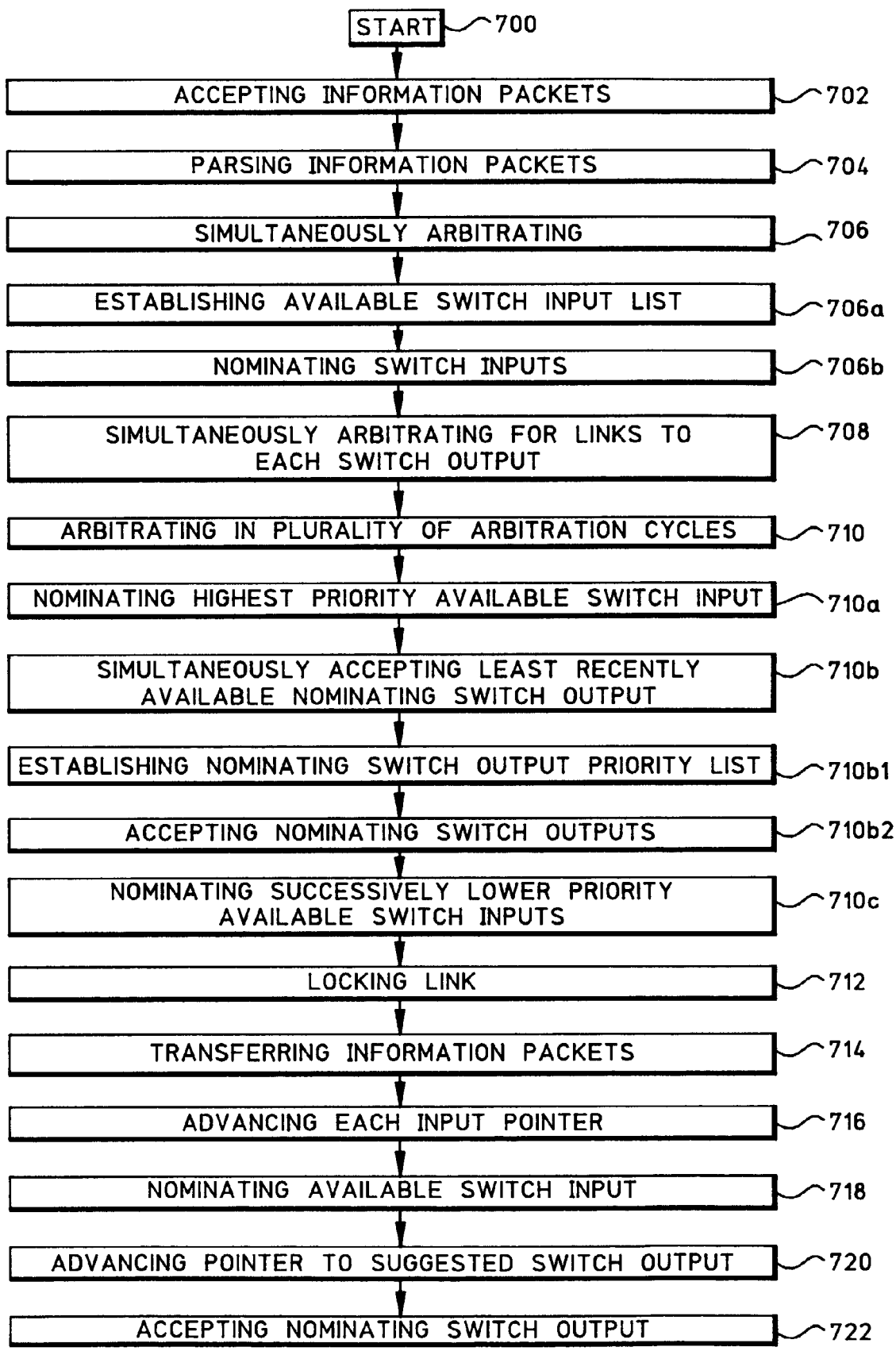
FIG. 7 is a flowchart depicting additional details of the method of FIG. 6.

FIG. 7 is a flowchart depicting additional details of the method of FIG. 6. The method begins with Step 700. Step 702 accepts variably sized information packets including a plurality of cells, at a plurality of switch inputs. The plurality of information packets address a plurality of switch outputs. Step 704 parses the information packets into units of one cell. Step 706 arbitrates for up to a first plurality of links to each switch output from a plurality of available switch inputs having information packets addressed to that switch output, per master decision cycle. Step 706a establishes an available switch input priority list, with a sequential pointer, for each switch output. Step 706b nominates switch inputs in response to the available switch input priority list. Step 708 arbitrates for links to each switch output, for each of the first plurality of crossbars. Step 710 arbitrates in a plurality of arbitration cycles each decision cycle. Step 710a, for each switch output, nominates the highest priority available switch input in a first arbitration cycle. Step 710b, for each switch input receiving multiple nominations, simultaneously accepts the least recently available nominating switch output. Step 710b1, for each available switch input, establishes a nominating switch output priority list. Step 710b2 accepts nominating switch outputs in response to the nominating switch output priority list. Step 710c nominates successively lower priority available switch inputs in subsequent arbitration cycles if the nominating switch output is not accepted. Step 712 locks the links. Step 714 transfers information packets across the links in units of one cell per master decision cycle. Step 716 advances each input pointer to an input next in sequence to the selected switch input, when the selection occurs in the first arbitration cycle. Step 718 nominates the available switch input closest in succession to the second switch input in subsequent arbitrations.

In some aspects of the invention, accepting nominating switch outputs in response to the nominating switch output priority list in Step 710b2 includes limiting the nominating output arbitration process to a single arbitration cycle.

In some aspects of the invention, establishing a nominating switch output priority list in Step 710b1 includes creating a sequential output pointer for each nominating switch output priority list. Step 720, following the acceptance of a nominating switch output, advances the pointer to a suggested switch output, next in sequence to the selected switch output. Step 722 accepts the nominating switch output closest in succession to the suggested switch output in subsequent arbitrations.

Figure 8:
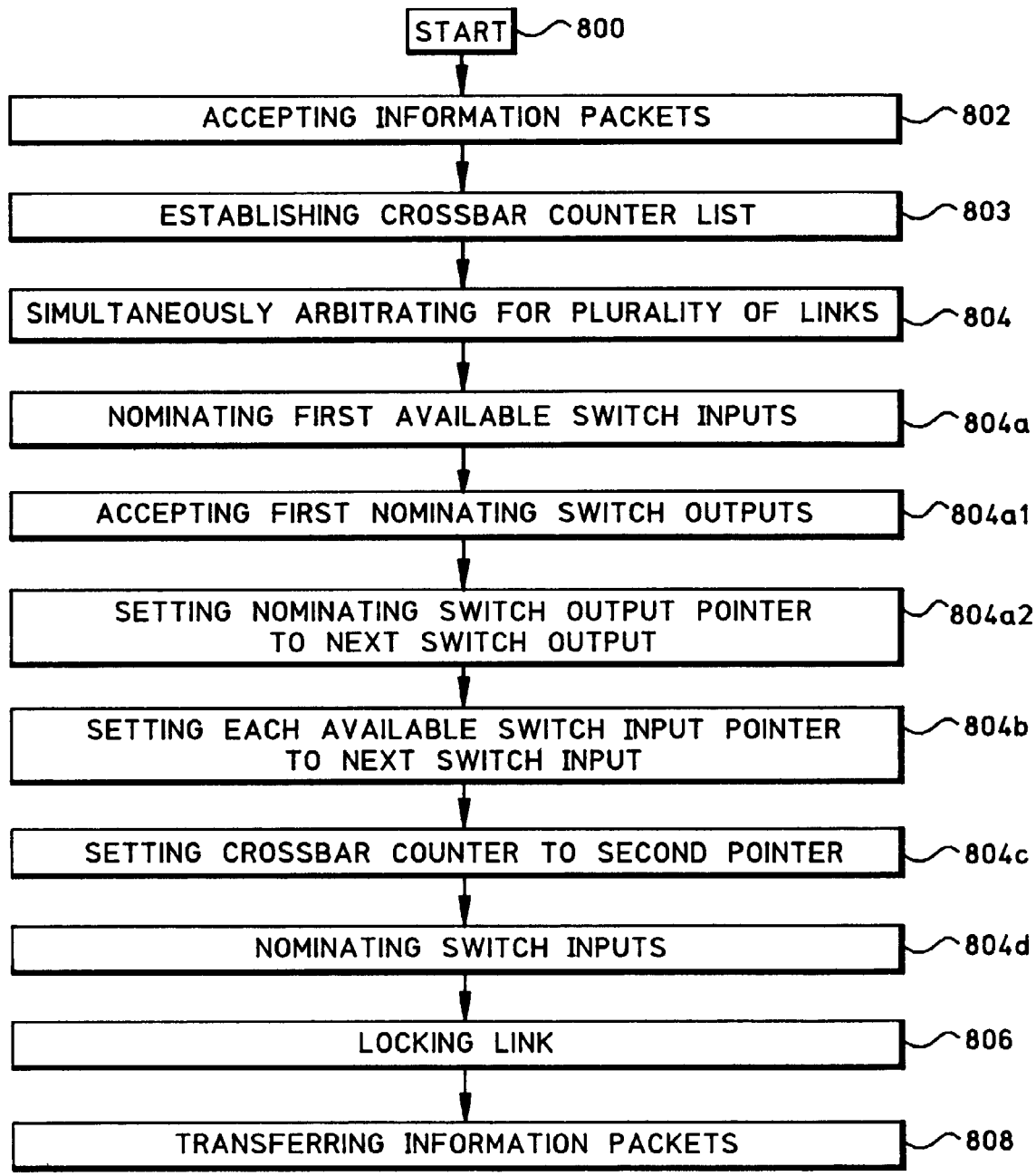
FIG. 8 is a flowchart depicting additional details of the hierarchical arbitration method in a switch system including a first plurality of crossbars with a plurality of parallel routed switch inputs and a plurality of parallel routed switch outputs.

FIG. 8 is a flowchart depicting additional details of the hierarchical arbitration method in a switch system including a first plurality of crossbars with a plurality of parallel routed switch inputs and a plurality of parallel routed switch outputs. The method begins with Step 800. Step 802 accepts variably sized information packets including a plurality of cells at a plurality of switch inputs. The plurality of information packets address a plurality of switch outputs. Step 804 simultaneously arbitrates for a plurality of links between switch inputs and switch outputs in a plurality of arbitration cycles, for each crossbar. Each switch output in a crossbar simultaneously nominates an available switch input. Step 806 locks the links. Step 808 transfers information packets across the links.

Step 803 establishes a crossbar counter list. In some aspects of the invention, simultaneously arbitrating for a plurality of links between switch inputs and switch outputs in Step 804, includes arbitrating between a plurality of available switch inputs, in response to the crossbar selected from the crossbar priority counter.

In some aspects of the invention, simultaneously arbitrating for a plurality of links, for each of the first plurality of crossbars, in Step 804 includes arbitrating in a plurality of arbitration cycles, per decision cycle, for each selected crossbar.

Simultaneously arbitrating for links to each switch output, for each of the first plurality of crossbars in Step 804 includes sub-steps. Step 804a nominates first available switch inputs for each switch output for a first crossbar, selected in response to the crossbar counter. Step 804b following the acceptance of the first available switch inputs for each switch output, sets each available switch input priority list pointer to a second switch input, next in sequence to the first switch input. Step 804c sets the crossbar counter to a second crossbar, next in succession to the first crossbar. Step 804d nominates switch inputs closest in succession to the second switch input for each switch output for the second crossbar.

In some aspects of the invention, simultaneously arbitrating for a plurality of links, for each of the first plurality of crossbars, in Step 804 includes further steps. Step 804a1 accepts first nominating switch outputs for a first crossbar, for each switch input. Step 804a2, following the acceptance of the first nominating switch outputs for each switch input, sets each nominating switch output priority list pointer to a second switch output, next in sequence to the first switch output. Step 804c sets the crossbar counter to a second crossbar, next in succession to the first crossbar. Step 804d accepts nominating switch outputs in the second crossbar closest in succession to the second switch output for each switch input.

Figure 9:
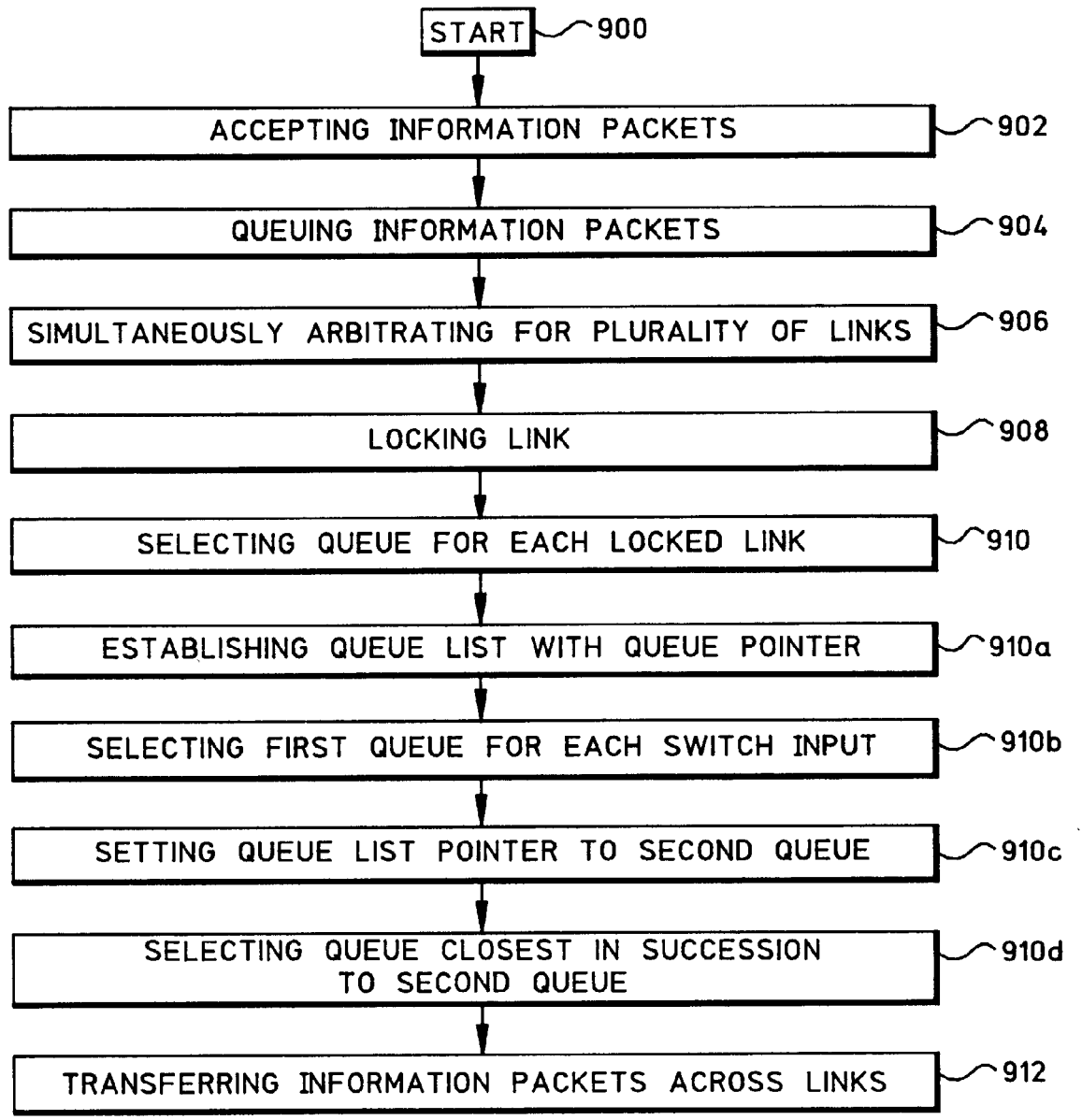
FIG. 9 is a flowchart illustrating a hierarchical arbitration method with special emphasis on the queuing process.

FIG. 9 is a flowchart illustrating a hierarchical arbitration method with special emphasis on the queuing process. As above, the switch system includes a first plurality of crossbars with a plurality of parallel routed switch inputs and a plurality of parallel routed switch outputs. The method begins with Step 900. Step 902 accepts variably sized information packets including a plurality of cells at a plurality of switch inputs. The plurality of information packets address a plurality of switch outputs. Step 904 queues the information packets into a plurality of queues at each switch input. Step 906 simultaneously arbitrates for a plurality of links between switch inputs and switch outputs. Step 908 locks the links. Step 910 selects a queue for each locked link, for each crossbar. Step 912 transfers information packets across the links.

In some aspects of the invention, selecting a queue for each locked link, for each crossbar, in Step 910 includes selecting the least recently available queue.

In some aspects, selecting a queue for each crossbar in Step 910 includes sub-steps. Step 910a establishes a queue list with a queue pointer for each switch input. Step 910b, for a first crossbar, selects a first queue for each switch input accepting a nominating switch output, in response to the queue pointer. Step 910c, following the selection of the first queue for each switch input accepting a nominating switch output for the first crossbar, sets each queue list pointer to a second queue, next in sequence to the first queue. Step 910d selects a queue closest in succession to the second queue for each switch input accepting a nominating switch output in a second crossbar.

Figure 10:
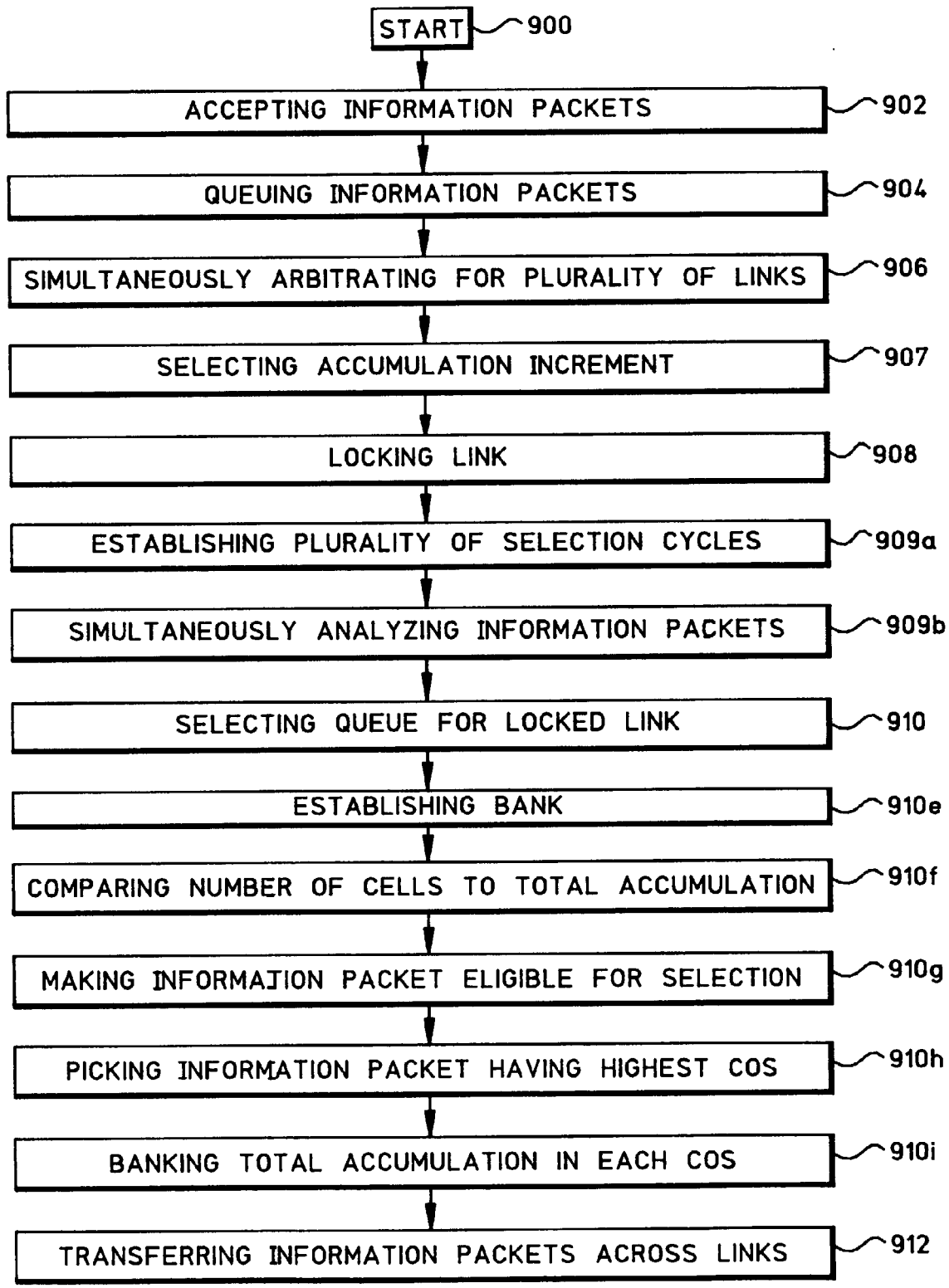
FIG. 10 is a flowchart depicting an alternate embodiment of the method of FIG. 9.

FIG. 10 is a flowchart depicting an alternate embodiment of the method of FIG. 9. Steps 902–912 in FIG. 10 are substantially equivalent to the same numbered steps in FIG. 9. Accepting variably sized information packets, at a plurality of switch inputs, in Step 902 includes accepting information packets having a ranked class of service (COS). Queuing information packets into a plurality of queues in Step 904 includes queuing the information packets by COS.

Selecting a queue in Step 910 includes each nominated switch input selecting a queue in response to COS of the information packets available in the queue for each crossbar. Step 909a establishes a plurality of selection cycles. Step 909b simultaneously analyzes information packets at the head of each queue in each selection cycle.

In some aspects of the invention, simultaneously analyzing the information packets at the head of each queue in Step 909b includes analyzing information packets in response to the number of cells in each information packet.

Step 907 selects an accumulation increment for each of the plurality of COS queues, where each accumulation increment corresponds to a selected number of cells. Simultaneously analyzing information packets in Step 909b includes comparing the number of cells in the information packet at the head of the queue to its corresponding accumulation increment.

In some aspects of the invention, selecting an accumulation increment for each of the plurality of COS queues in Step 907 includes selecting accumulation increments with larger numbers of cells for higher ranking COS queues.

In some aspects of the invention, simultaneously analyzing information packets in Step 909b includes comparing the number of cells in the information packet at the head of the queue to a corresponding total accumulation in a plurality of selection cycles.

Step 910 of selecting a queue for a locked link includes sub-steps. Step 910e establishes a bank for banking accumulation increments for each COS queue. Step 910f, in each selection cycle, compares the number of cells in the information packets at the head of each COS queue to a total accumulation that includes the accumulation increment, plus the banked accumulation. Step 910g makes the information packet eligible for selection if the information packets have a number of cells less than, or equal to, the total accumulation. Step 910h picks the information packet in the queue that has the highest COS, or is next in an ordered service list, if information packets are eligible from a plurality of queues. Step 910i banks the total accumulation in each COS queue if no information packets are picked. Step 910i also banks the total accumulation, minus the number if cells in the selected packet, if an information packet is selected. The selection cycle repeats until an information packet is selected, or until the maximum number of selection cycles is reached.

Figure 11:
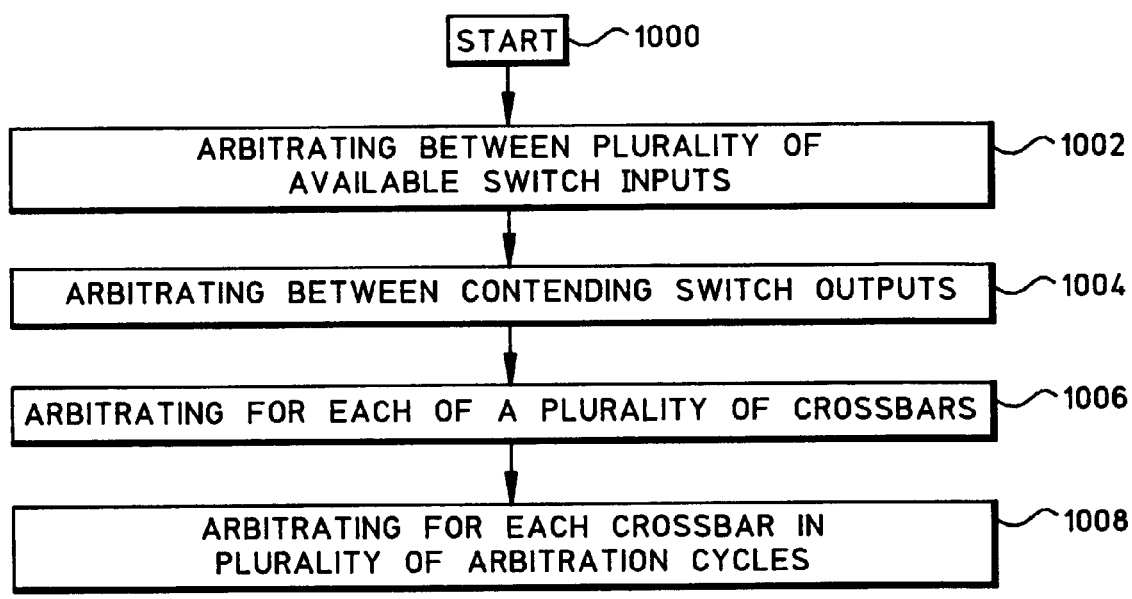
FIG. 11 is a flowchart depicting a hierarchical arbitration method from a different perspective.

FIG. 11 is a flowchart depicting a hierarchical arbitration method from a different perspective. The method begins with Step 1000. Step 1002 for each switch output, arbitrates between a plurality of available switch inputs. Step 1004 arbitrates between the contending switch outputs. Step 1006 arbitrates between available switch inputs, and between nominating switch outputs for each of a plurality of crossbars. Step 1008 arbitrates for each crossbar in a plurality of arbitration cycles.

Examples have been given above for a hierarchical arbitration system and method that permit variable length (sized) information packets to be switched. The system and method are applicable to broadband communications system, such as in a synchronous optical network (SONET). The invention can be enabled in an integrated circuit (IC), a family of related ICs, or as a combination of IC and discrete circuits. Other variations and embodiments of the invention will occur to those skilled in the art.

We claim:

1. In a switch system including a first plurality of crossbars with a plurality of parallel routed switch inputs and a plurality of parallel routed switch outputs, a hierarchical arbitration method comprising:
    establishing a crossbar counter list;
    accepting variably sized information packets including a plurality of cells, at a plurality of switch inputs, the plurality of information packets addressing a plurality of switch outputs;
    simultaneously arbitrating for a plurality of links between switch inputs and switch outputs in a plurality of arbitration cycles for each crossbar, where each switch output in a crossbar simultaneously nominates an available switch input;
    locking the links;
    transferring information packets across the links; and,
    wherein simultaneously arbitrating for a plurality of links between switch inputs and switch outputs, for each of the first plurality of crossbars, includes arbitrating between a plurality of available switch inputs, in response to a crossbar selected from the crossbar counter list.

2. The method of claim 1 wherein simultaneously arbitrating for a plurality of links, for each of the first plurality of crossbars, includes arbitrating in a plurality of arbitration cycles, for each selected crossbar.

3. The method of claim 2 wherein simultaneously arbitrating for links to each switch output, for each of the first plurality of crossbars includes:
    nominating first available switch inputs for each switch output for a first crossbar, selected in response to the crossbar counter;
    following the acceptance of the first available switch inputs for each switch output, setting each available switch input priority list pointer to a second switch input, next in sequence to the first switch input;
    setting the crossbar counter to a second crossbar, next in succession to the first crossbar; and,
    nominating switch inputs closest in succession to the second switch input for each switch output for the second crossbar.

4. The method of claim 3 wherein simultaneously arbitrating for a plurality of links, for each of the first plurality of crossbars, includes:
    accepting first nominating switch outputs for a first crossbar, for each switch input;
    following the acceptance of the first nominating switch outputs for each switch input, setting each nominating switch output priority list pointer to a second switch output, next in sequence to the first switch output;
    setting the crossbar counter to a second crossbar, next in succession to the first crossbar; and,
    accepting nominating switch outputs in the second crossbar closest in succession to the second switch output for each switch input.

5. In a switch system including a first plurality of crossbars with a plurality of parallel routed switch inputs and a plurality of parallel routed switch outputs, a hierarchical arbitration method comprising:
    accepting variably sized information packets including a plurality of cells at a plurality of switch inputs, the plurality of information packets addressing a plurality of switch outputs;
    at each switch input, queuing the information packets into a plurality of queues;
    simultaneously arbitrating for a plurality links between switch inputs and switch outputs;
    locking the links;

selecting a queue for each locked link, for each crossbar, by selecting the least recently available queue as follows:

for each switch input, establishing a queue list with a queue pointer;

at a first crossbar, selecting a first queue for each switch input accepting a nominating switch output, in response to the queue pointer;

following the selection of the first queue for each switch input accenting a nominating switch output in the first crossbars, setting each queue list pointer to a second queue, next in sequence to the first queue; and, selecting a queue closest in succession to the second queue for each switch input accepting a nominating switch output in a second crossbar; and, transferring information packets across the links.

6. The method of claim 5 wherein accepting information packets, at a plurality of switch inputs, includes accepting information packets having a ranked class of service (COS);

wherein queuing information packets into a plurality of queues includes queuing the information packets by COS; and, wherein selecting a queue includes each nominated switch input selecting a queue in response to COS of the information packets available for each crossbar.

7. The method of claim 6 further comprising:

establishing a plurality of selection cycles; and, simultaneously analyzing information packets at the head of each queue in each selection cycle.

8. The method of claim 7 wherein simultaneously analyzing the information packets at the head of each queue includes analyzing information packets in response to the number of cells in each information packet.

9. The method of claim 8 further comprising:

selecting an accumulation increment for each of the plurality of COS queues, where each accumulation increment corresponds to a selected number of cells; and, wherein simultaneously analyzing information packets includes comparing the number of cells in the information packet at the head of the queue to its corresponding accumulation increment.

10. The method of claim 9 wherein selecting an accumulation increment for each of the plurality of COS queues includes selecting accumulation increments with larger numbers of cells for higher ranking COS queues.

11. The method of claim 10 wherein simultaneously analyzing information packets includes comparing the number of cells in the information packet at the head of the queue to a corresponding total accumulation in a plurality of selection cycles.

12. The method of claim 11 wherein selecting a queue for a locked link includes:

for each COS queue, establishing a bank for banking accumulation increments;

in each selection cycle, comparing the number of cells in the information packets at the head of each COS queue to a total accumulation that includes the accumulation increment, plus the banked accumulation;

if an information packet has a number of cells less than, or equal to, the total accumulation, making the information packet eligible for selection;

if information packets are eligible from a plurality of queues, picking the information packet in the queue in response to a priority system;

if an information packet is picked, banking the total accumulation, minus the number of cells in the selected packet; and, if no information packets are picked, banking the total accumulation in each COS queue.

13. The method of claim 12 wherein information packets in the queue are picked in response to a priority system selected from the group including highest COS and next from an ordered service list.

14. An hierarchical arbitration system for transferring information across a switch, the system comprising:

a switch including a first plurality of crossbars having a plurality of parallel routed inputs and a plurality of parallel routed outputs connected to the switch inputs in response to the arbitration commands accepted on a control input;

an arbiter having an output connected to the switch control input to supply simultaneously arbitrated link commands for a plurality of links between the switch inputs and the switch outputs, for each crossbar;

a queue assembler having a plurality of inputs to accept variably sized information packets having a plurality of cells and addressing a plurality of outputs, and a control input to accept queue selection commands, the queue assembler grouping the information packets by switch output address, queuing the information packets into a plurality of queues for each address grouping, and supplying queues, selected in response to queue selection commands, at a plurality of outputs connected to corresponding switch inputs; and, wherein the switch locks the links between switch inputs and switch outputs, in response to commands from the arbiter, to transfer information packets across the links and wherein the arbiter includes a crossbar counter to select a crossbars, and in response to a selected crossbar, simultaneously arbitrates between each arbitrating switch output and nominated switch inputs from an available switch input priority list, by selecting the least recently used available switch input in a plurality of arbitration cycles for each crossbar, as follows:

the arbiter nominates the highest priority available switch input, for each arbitrating switch output, in a first arbitration cycle, and if the nominating switch output is not accepted, the arbiter nominates successively lower priority available switch inputs in subsequent arbitration cycles;

each available switch input priority list includes a sequential input pointer that, following the acceptance of a first nominating switch output by a first switch input, is incremented to a second switch input, next in sequence to the first switch input; and, the arbiter nominates the available switch input closest in succession to the second switch input in subsequent arbitrations;

wherein the arbiter arbitrates between the nominating switch outputs in response to a twitch input receiving multiple switch output nominations by accepting the least recently available nominating switch output as follows:

the arbiter accepts nominating switch outputs in response to a nominating switch cutout priority list, for each switch input receiving a plurality of nominating switch outputs;

each nominating switch output priority list includes a sequential output pointer that, following the acceptance of a nominating switch output, is incremented to a second switch output, next in sequence to the first switch output; and, the arbiter accepts the nominating switch output closest in succession to second switch output in subsequent arbitrations.

15. The system of claim 14 wherein the input pointer is incremented in response to the acceptance of the first nominating switch output by a first switch input, in the first arbitration cycle only.

16. The system of claim 14 wherein the output pointer is incremented in response to the acceptance of the first nominating switch output by a first switch input, in the first arbitration cycle only.

17. The system of claim 14 wherein the arbiter arbitrates between each switch output and a plurality of available switch inputs by arbitrating in a plurality of arbitration cycles, for each crossbar.

18. The system of claim 17 wherein the arbiter nominates first available switch inputs, for each switch output, for a first crossbar;

wherein the available switch input priority list pointers are incremented to a second switch input, next in succession to the first switch input, following the acceptance of first available switch inputs;

wherein the crossbar counter is incremented to a second crossbar next in succession to the first crossbar; and, wherein the arbiter nominates switch inputs closest in succession to the second switch input for each switch output of the second crossbar.

19. The system of claim 18 wherein the arbiter simultaneously arbitrates between a plurality of nominating switch outputs, sequentially for each crossbar.

20. The system of claim 19 wherein the crossbar counter selects a first crossbar;

wherein the nominating switch output priority list pointers are directed to first switch outputs;

wherein the arbiter selects the first nominating switch outputs for the first crossbar;

wherein the arbiter accepts first nominating switch outputs;

wherein the nominating switch output priority list pointers are incremented to a second switch output, next in sequence to the first switch output, following the acceptance of the first nominating switch outputs;

wherein the crossbar counter selects a second crossbar, next in succession to the first crossbar; and, wherein the arbiter accepts nominating switch outputs for the second crossbar closest in succession to the second switch output for each switch input.

21. An hierarchical arbitration system for transferring information across a switch, the system comprising:

a switch including a first plurality of crossbars having a plurality of parallel routed inputs and a plurality of parallel routed outputs connected to the switch inputs in response to the arbitration commands accepted on a control input;

an arbiter having an output connected to the switch control input to supply simultaneously arbitrated link commands for a plurality of links between the switch inputs and the switch outputs, for each crossbar;

a queue assembler having a plurality of inputs to accept variably sized information packets having a plurality of cells and addressing a plurality of outputs, and a control input to accept queue selection commands, the queue assembler grouping the information packets by switch output address, queuing the information packets into a plurality of queues for each address grouping, and supplying queues, selected in response to queue selection commands for each crossbar, at a plurality of outputs connected to corresponding switch inputs;

wherein the switch locks the links between switch inputs and switch outputs, in response to commands from the arbiter, to transfer information packets across the links;

wherein the arbiter includes a queue list with a queue pointer directed to a first queue, for each switch input, and selects the least recently available queue as follows:

in response to the queue pointer, the arbiter selects the first queue for each switch input accepting a nominating switch output for a first crossbar;

wherein the queue pointers, following the selection of each first queue, are incremented to a second queue, next in sequence to the first queue; and, wherein the arbiter selects queues closest in succession to the second queue for each switch input accenting a nominating switch output for the second crossbar; and, wherein the arbiter selects the least recently available queue for each crossbar.

22. The system of claim 21 wherein the queue assembler accepts information packets having a ranked class of service (COS), and queues the information packets by COS; and, wherein the arbiter selects a queue in response to COS of the information packet available for each crossbar.

23. The system of claim 22 wherein the arbiter establishes a plurality of selection cycles per minor decision cycle, and simultaneously analyzes information packets at the head of each queue in each selection cycle.

24. The system of claim 23 wherein the arbiter simultaneously analyzes the information packets at the head of each queue in response to the number of cells in each information packet.

25. The system of claim 24 wherein the arbiter has an input to accept commands selecting an accumulation increment for each of the plurality of COS queues, where each accumulation increment defines a selected number of cells; and, wherein the arbiter selects an information packet for transfer in response to the simultaneous analysis by comparing the number of cells in the information packet at the head of the queue to its corresponding accumulation increment.

26. The system of claim 25 wherein the arbiter accepts commands selecting accumulation increments with larger numbers of cells for higher ranking COS queues.

27. The system of claim 26 wherein the arbiter selects an information packet by comparing the number of cells in the information packet at the head of the queue to a corresponding total accumulation in a plurality of selection cycles.

28. The system of claim 27 further comprising:

for each COS queue, a bank having a port connected to the arbiter for banking accumulation increments and supplying a banked accumulation;

wherein the arbiter, in each selection cycle, compares the number of cells in the information packets at the head of each COS queue to a total accumulation that includes the accumulation increment, plus the banked accumulation, as follows:

if an information packet has a number of cells less than, or equal to the total accumulation, making the information packet eligible for selection;

if information packets are eligible from a plurality of queues, picking the information packet in response to a priority system selected from the group including highest COS and the least recently used ordered service list;

if an information packet is picked, booking the total accumulation minus the number of cells in the selected packet in the bank corresponding to the selected packet COS queue; and, if no information packets are picked, banking the total accumulation of each COS queue in its corresponding bank.

29. In a switch system including a first plurality of crossbars with a plurality of parallel routed switch inputs and a plurality of parallel routed switch outputs, a hierarchical arbitration method comprising:

accepting variably sized information packets having a ranked class of service (COS) and including a plurality of cells at a plurality of switch inputs, the plurality of information packets addressing a plurality of switch outputs;

at each switch input, queuing the information packets by COS into a plurality of queues;

simultaneously arbitrating for a plurality links between switch inputs and switch outputs;

locking the links;

establishing a plurality of selection cycles;

simultaneously analyzing information packets at the head of each queue in each selection cycle;

selecting a queue for each locked link, for each crossbar, wherein each nominated switch input selecting a queue in response to COS of the information packets available for each crossbar; and, transferring information packets across the links.

30. An hierarchical arbitration system for transferring information across a switch, the system comprising:

a switch including a first plurality of crossbars having a plurality of parallel routed inputs and a plurality of parallel routed outputs connected to the switch inputs in response to the arbitration commands accepted on a control input;

an arbiter having an output connected to the switch control input to supply simultaneously arbitrated link commands for a plurality of links between the switch inputs and the switch outputs, for each crossbar;

a queue assembler having a plurality of inputs to accept variably sized information packets having a ranked class of service (COS) with a plurality of cells and addressing a plurality of outputs, and a control input to accept queue selection commands, the queue assembler grouping the information packets by switch output address, queuing the information packets into a plurality of queues for each address grouping by COS, and supplying queues, selected in response to queue selection commands for each crossbar, at a plurality of outputs connected to corresponding switch inputs;

wherein the switch locks the links between switch inputs and switch outputs, in response to commands from the arbiter, to transfer information packets across the links; and, wherein the arbiter selects a queue in response to COS of the information packet available for each crossbar, by establishing a plurality of selection cycles per minor decision cycle, and simultaneously analyzing information packets at the head of each queue in each selection cycle.

* * * * *